US 9,413,204 B2

(12) United States Patent
Ota et al.

(10) Patent No.: US 9,413,204 B2
(45) Date of Patent: Aug. 9, 2016

(54) MOTOR-DRIVEN COMPRESSOR

(71) Applicant: KABUSHIKI KAISHA TOYOTA JIDOSHOKKI, Kariya-shi, Aichi-ken (JP)

(72) Inventors: Takayuki Ota, Aichi-ken (JP); Kosaku Tozawa, Aichi-ken (JP); Ken Suitou, Aichi-ken (JP); Tatsushi Mori, Aichi-ken (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 476 days.

(21) Appl. No.: 13/835,230

(22) Filed: Mar. 15, 2013

(65) Prior Publication Data
US 2013/0251557 A1    Sep. 26, 2013

(30) Foreign Application Priority Data

Mar. 20, 2012  (JP) ................. 2012-062909
Dec. 27, 2012  (JP) ................. 2012-284148

(51) Int. Cl.
*H02K 5/24* (2006.01)
*H02K 15/14* (2006.01)
(Continued)

(52) U.S. Cl.
CPC ............... *H02K 5/24* (2013.01); *F01C 21/007* (2013.01); *F02B 61/00* (2013.01); *F04B 17/03* (2013.01); *F04C 23/008* (2013.01); *H02K 15/14* (2013.01); *F04C 18/0215* (2013.01); *F04C 2230/602* (2013.01); *F04C 2230/604* (2013.01); *F04C 2240/30* (2013.01); *F04C 2240/805* (2013.01); *F04C 2270/12* (2013.01)

(58) Field of Classification Search
CPC ............... F04C 18/0215; F04C 23/008; F04C 2230/604; F04C 2240/30; F04C 2240/805; F04B 17/03; H02K 5/24; H02K 15/14; F02B 61/00
USPC ........ 417/360, 363; D15/9; 181/202; 310/91; 248/637, 638, 640, 560
See application file for complete search history.

(56) References Cited

U.S. PATENT DOCUMENTS

| 4,600,367 A | 7/1986 | Terauchi et al. |
| 4,938,448 A | 7/1990 | Shimazaki |

(Continued)

FOREIGN PATENT DOCUMENTS

| CN | 1530541 A | 9/2004 |
| CN | 102207072 A | 10/2011 |

(Continued)

OTHER PUBLICATIONS

Communication dated Apr. 3, 2015 from the State Intellectual Property Office of the People's Republic of China in counterpart application No. 201310088687.4.

*Primary Examiner* — Devon Kramer
*Assistant Examiner* — Chirag Jariwala
(74) *Attorney, Agent, or Firm* — Sughrue Mion, PLLC

(57) ABSTRACT

A motor-driven compressor includes an electric motor, a compression mechanism driven by the electric motor to compress refrigerant, a housing accommodating the electric motor and the compression mechanism, and a support having a mounting to be fastened to an object by a fastener. One of the housing and the support has a projection and the other of the housing and the support has a recess that is engaged with the projection through a vibration damper so that the support supports the housing.

11 Claims, 17 Drawing Sheets

(51) Int. Cl.
*F02B 61/00* (2006.01)
*F01C 21/00* (2006.01)
*F04C 23/00* (2006.01)
*F04B 17/03* (2006.01)
*F04C 18/02* (2006.01)

(56) References Cited

U.S. PATENT DOCUMENTS

| | | | |
|---|---|---|---|
| 6,132,183 A * | 10/2000 | Li et al. | 417/363 |
| 6,669,452 B2 * | 12/2003 | Ogawa et al. | 417/360 |
| 7,398,855 B2 * | 7/2008 | Seel | F01C 21/10 181/200 |
| D659,720 S * | 5/2012 | Lucchi | D15/9 |
| 8,770,948 B2 | 7/2014 | Suitou et al. | |
| 2002/0131878 A1 | 9/2002 | Ogawa et al. | |
| 2012/0251357 A1* | 10/2012 | Yokoi et al. | 417/410.1 |

FOREIGN PATENT DOCUMENTS

| | | |
|---|---|---|
| DE | 20109722 U1 | 9/2001 |
| JP | 05-077640 A | 3/1993 |
| JP | 06-288353 A | 10/1994 |
| JP | 8-93990 A | 4/1996 |
| JP | 2002-276554 A | 9/2002 |
| KR | 10-2011-0037377 A | 4/2011 |

* cited by examiner

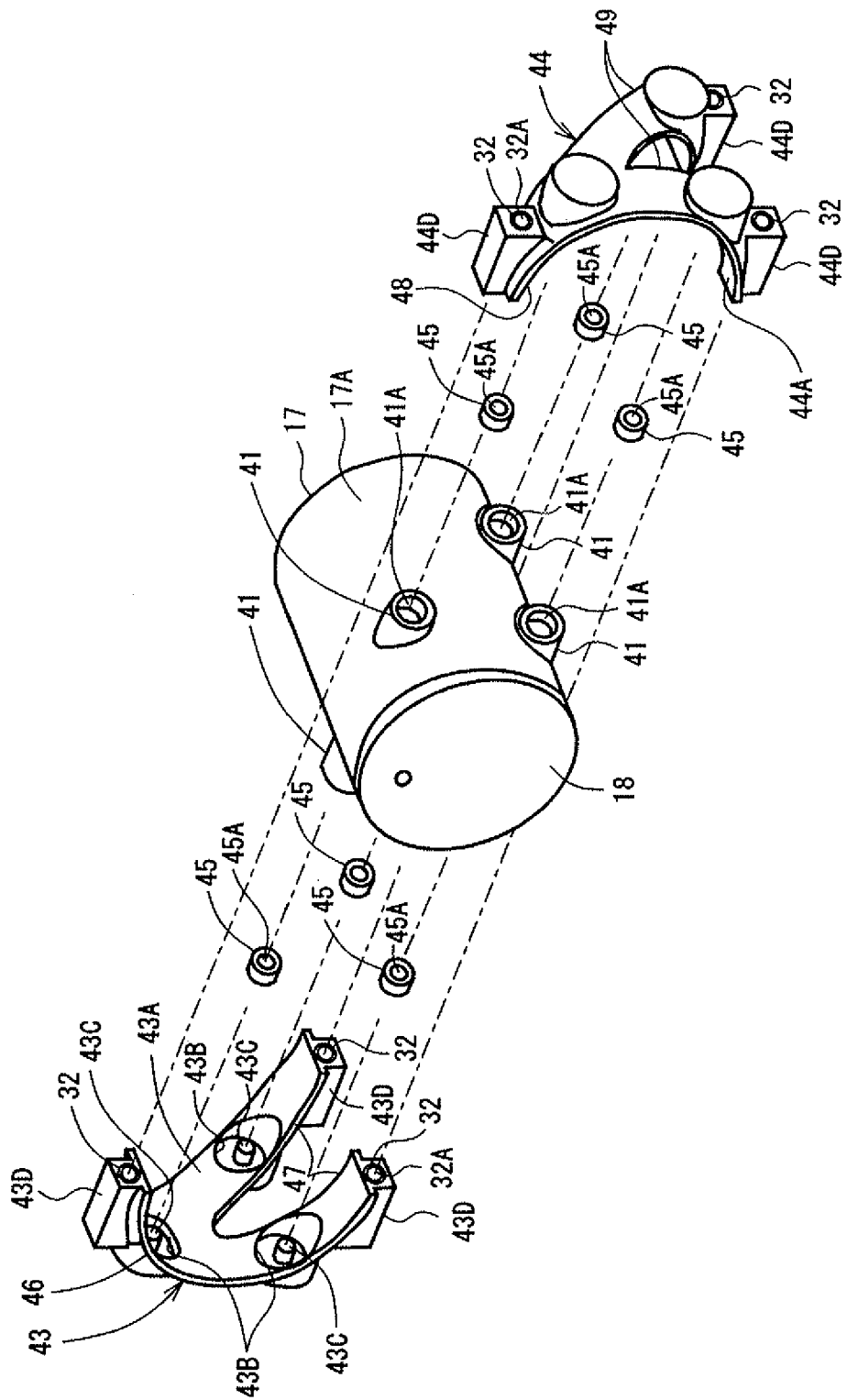

Axial direction

MOTOR-DRIVEN COMPRESSOR

BACKGROUND OF THE INVENTION

The present invention relates to a motor-driven compressor.

There is known a motor-driven compressor used in a vehicular air conditioner. Such compressor is installed in an engine compartment of a vehicle and mounted to a body frame of the vehicle by supports. Japanese Unexamined Patent Application Publication No. 5-77640 discloses a compressor in which a support having a bolt hole is circumferentially welded to the periphery of the compressor at a position close to the center of gravity of the compressor. With the compressor inserted in a hole formed through the body frame, the support is mounted to the body frame. Specifically, with a rubber mount interposed between the support and the body frame, a bolt with washer is inserted through the bolt hole of the support and the rubber mount and screwed into the body frame so that the compressor is mounted to the body frame. Such structure prevents excessive vibration of the compressor due to external vibration applied to the body frame while the vehicle is traveling.

The compressor disclosed in the publication No. 5-77640 is disadvantageous in that the bolt needs to be inserted through the bolt hole of the support and the rubber mount interposed between the support and the body frame in mounting the compressor to the body frame, which is troublesome. In addition, the support welded to the periphery of the compressor increases the entire size of the compressor, which requires a larger space for installation. Further, the shape of the rubber mount limits the orientation of the compressor relative to the vehicle body. Specifically, the compressor may be mounted to a horizontally extending part of the body frame, but mounting of the compressor to a vertically extending part of the body frame is difficult.

The present invention is directed to providing a motor-driven compressor which allows reduction of the vibration and easy installation to an object.

SUMMARY OF THE INVENTION

In accordance with an aspect of the present invention, a motor-driven compressor includes an electric motor, a compression mechanism driven by the electric motor to compress refrigerant, a housing accommodating the electric motor and the compression mechanism, and a support having a mounting to be fastened to an object by a fastener. One of the housing and the support has a projection and the other of the housing and the support has a recess that is engaged with the projection through a vibration damper so that the support supports the housing.

Other aspects and advantages of the invention will become apparent from the following description, taken in conjunction with the accompanying drawings, illustrating by way of example the principles of the invention.

BRIEF DESCRIPTION OF THE DRAWINGS

FIG. 7 is an exploded perspective view of the compressor of FIG. 6;

DETAILED DESCRIPTION OF THE EMBODIMENTS

Figure 1:
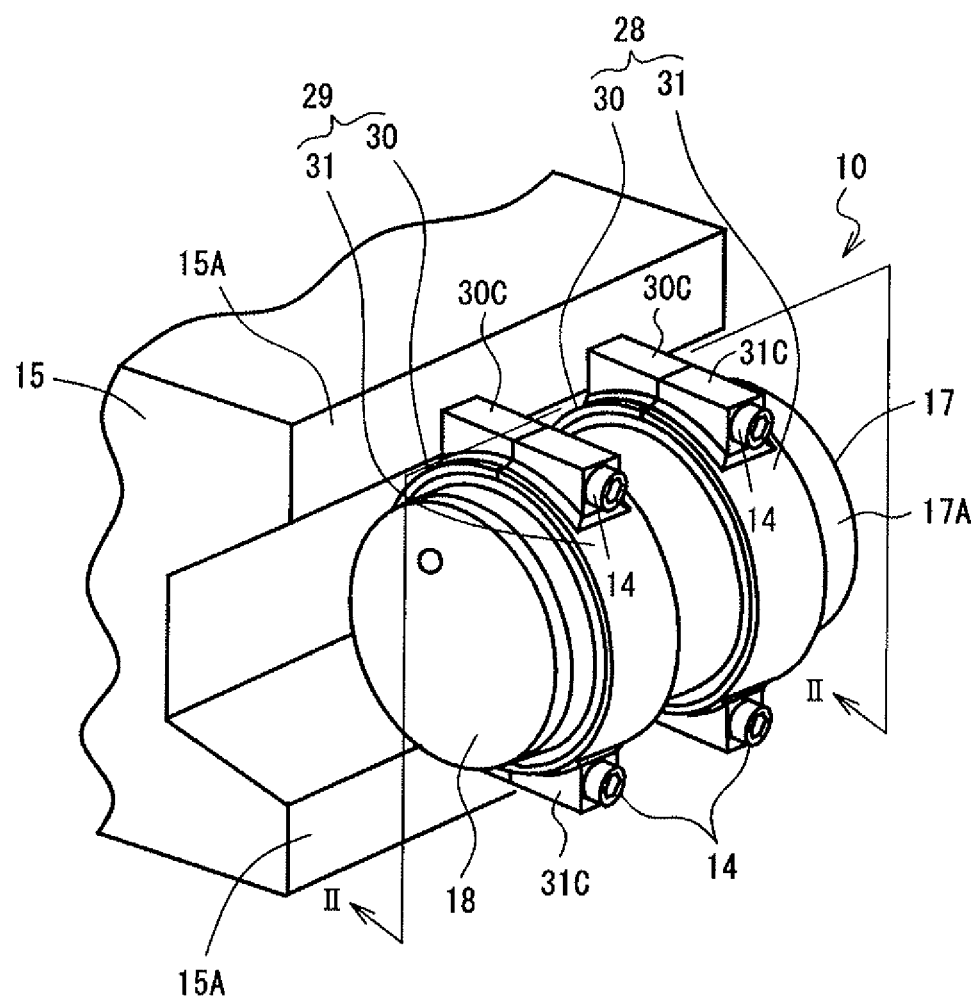
FIG. 1 is a perspective view of a motor-driven compressor according to a first embodiment of the present invention.
Figure 2:
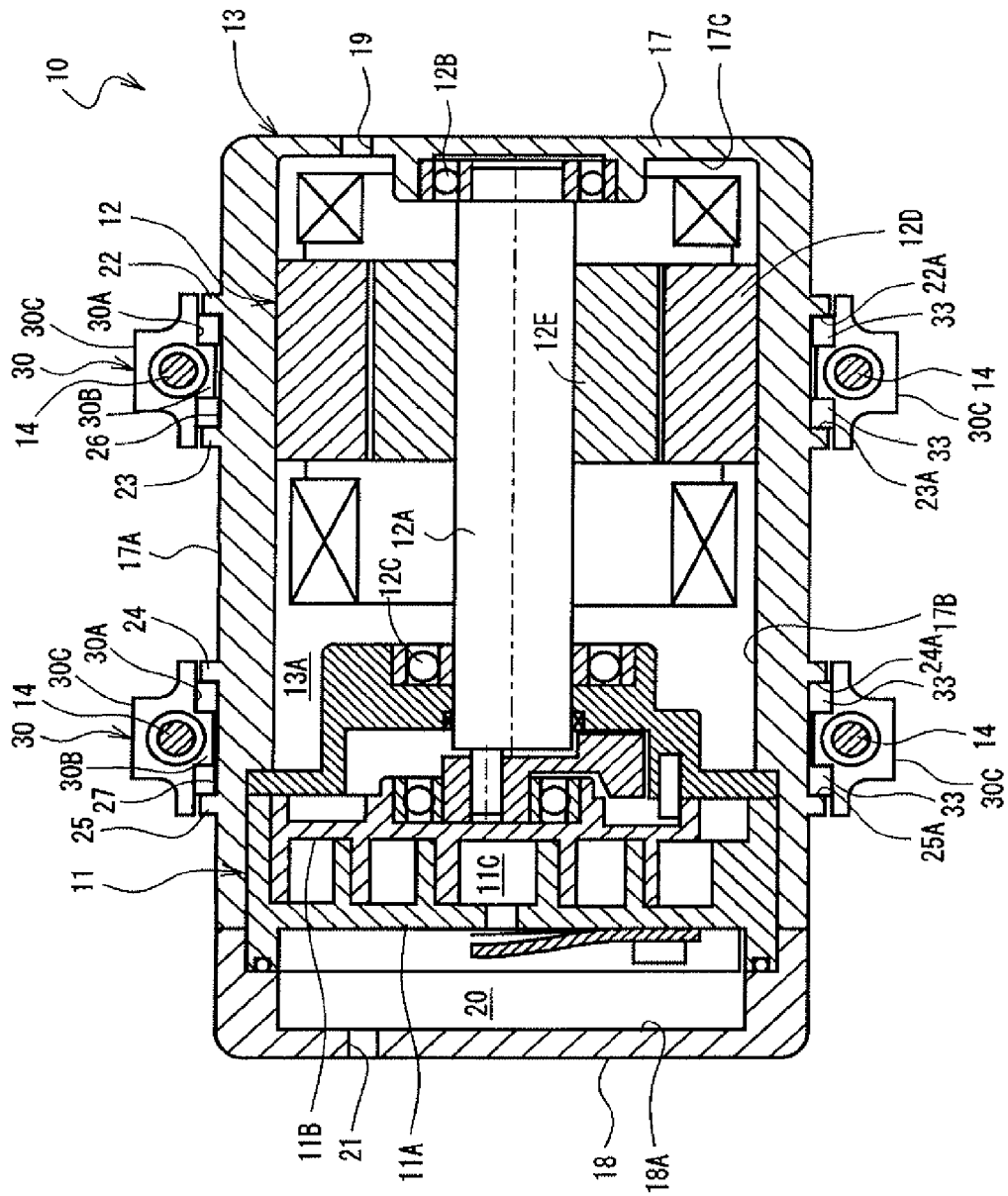
FIG. 2 is a longitudinal sectional view taken along the line II-II of FIG. 1.

The following will describe the embodiments of the motor-driven compressor according to the present invention with reference to the accompanying drawings. Referring to FIGS. 1 and 2, the motor-driven compressor of the first embodiment which is designated generally by 10 is intended for use in an air conditioner for temperature control of a vehicle passenger compartment and to be installed, for example, in an engine compartment of the vehicle. The compressor 10 includes a compression mechanism 11, an electric motor 12, a hermetic housing 13 accommodating therein the compression mechanism 11 and the electric motor 12, and two supports 28, 29 having mountings fastened by bolts 14 or fasteners to an object 15 such as a frame or engine of the vehicle. As shown in FIG. 1, the object 15 to which the compressor 10 is mounted has two projections 15A projecting laterally toward the compressor 10. Each projection 15A has a vertical surface facing the mounting of the compressor 10 and having threaded holes 15B (see FIG. 4C) into which the bolts 14 are screwed.

The housing 13 is of a cylindrical shape and formed of a first housing 17 having an opening at one end on the left side in FIG. 2 and a second housing 18 connected to the first housing 17 to close the opening. The housing 13 has an interior space 13A in which a compression mechanism 11 and an electric motor 12 are accommodated. The first and second housings 17, 18 are made of a metal such as steel or aluminum.

The compression mechanism 11 disposed in the interior space 13A has a fixed scroll 11A mounted on the inner peripheral surface 17B of the first housing 17 and a movable scroll 11B disposed in facing relation to the fixed scroll 11A and engaged therewith so as to form therebetween a compression chamber 11C. The first housing 17 accommodates a drive shaft 12A that is rotatably supported at opposite ends thereof by bearings 12B, 12C.

The first housing 17 has a bottom wall 17C at the other end on the right side in FIG. 2. The electric motor 12 is disposed in the interior space 13A on the side of the compression mechanism 11 opposite from the second housing 18 and adjacent to the bottom wall 17C of the first housing 17. The electric motor 12 has a stator 12D, a rotor 12E and the aforementioned drive shaft 12A. The stator 12D is mounted on the inner peripheral surface 17B of the first housing 17 and supplied with three-phase AC power from a driver circuit (not shown). The rotor 12E is fixed on the drive shaft 12A inside the stator 12D. The rotor 12E is driven to rotate by electric power supplied to the stator 12D.

An inlet port 19 is formed through the bottom wall 17C of the first housing 17 and connected through a tube (not shown) to an external refrigerant circuit (not shown either). The first and second housings 17, 18 form therebetween a discharge chamber 20. An outlet port 21 is formed through the end wall 18A of the second housing 18 and connected through a tube (not shown) to the external refrigerant circuit. While the compression mechanism 11 is being driven by the electric motor 12, refrigerant is introduced from the external refrigerant circuit through the inlet port 19 into the housing 13 and compressed by the compression mechanism 11. The compressed refrigerant is discharged out of the housing 13 through the outlet port 21 into the external refrigerant circuit.

Figure 3:
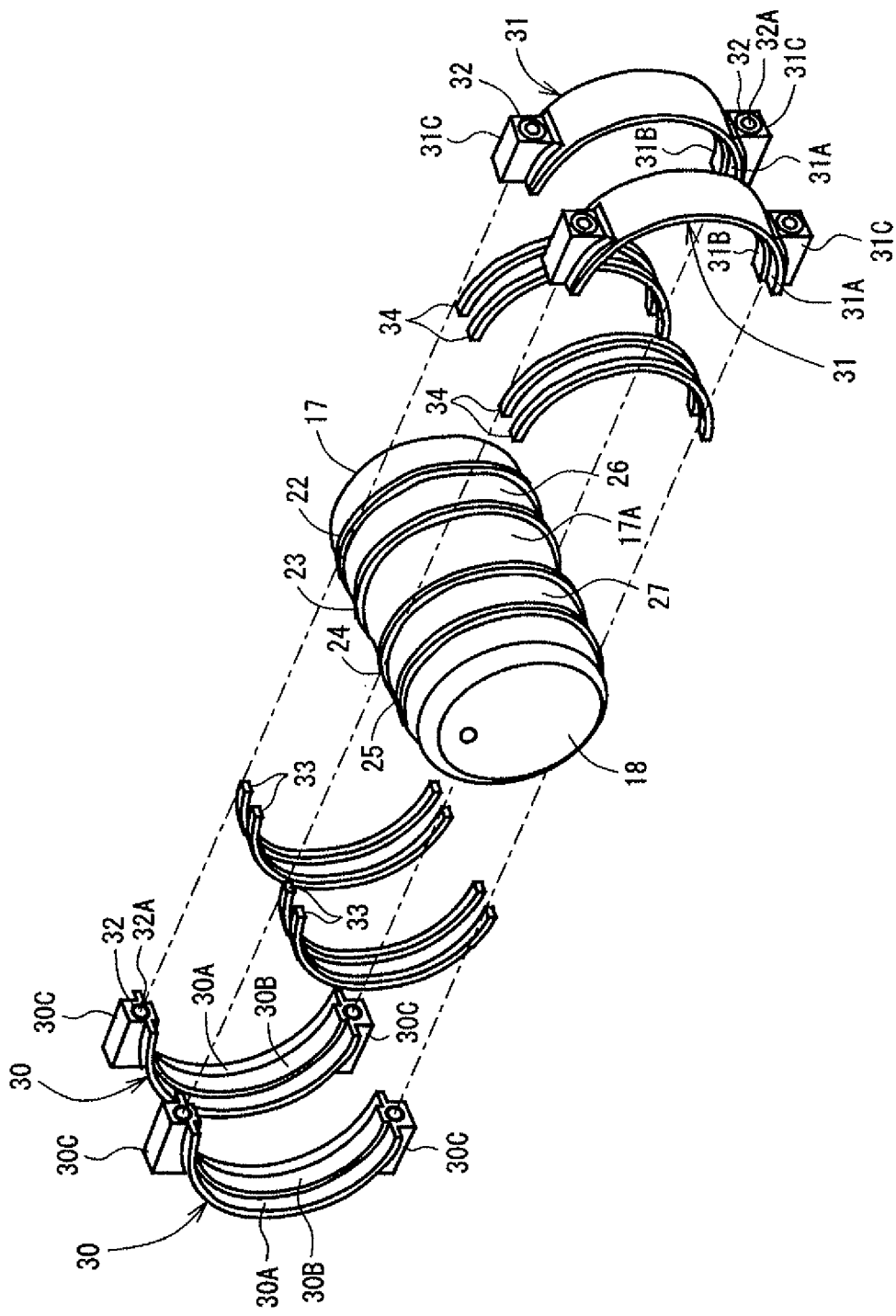
FIG. 3 is an exploded perspective view of the compressor of FIG. 1.

As shown in FIGS. 2 and 3, the first housing 17 has on its outer peripheral surface 17A four ribs 22, 23, 24 and 25 each extending over the entire circumference of the outer peripheral surface 17A of the first housing 17 in the form of an annular projection. The ribs 22, 23 which are disposed on the side of the first housing 17 that is adjacent to the bottom wall 17C form therebetween a recess 26 that is specifically defined by inner surfaces 22A, 23A of the respective ribs 22, 23 and the part of the outer peripheral surface 17A of the first housing 17 between the ribs 22, 23. The ribs 24, 25 which are disposed on the side of the first housing 17 that is adjacent to the second housing 18 form therebetween a recess 27 that is specifically defined by inner surfaces 24A, 25A of the respective ribs 24, 25 and the part of the outer peripheral surface 17A of the first housing 17 between the ribs 24, 25. The recesses 26, 27 are disposed on the outer peripheral surface 17A of the first housing 17 at the respective positions associated with the compression mechanism 11 and the electric motor 12.

As shown in FIG. 1, the supports 28, 29 are substantially the same in shape and disposed extending over and covering the entire circumference of the outer peripheral surface 17A of the first housing 17. The supports 28, 29 are disposed at the positions associated with the recesses 26, 27, respectively. Each of the supports 28, 29 includes a first support member 30 and a second support member 31. The first and second support members 30, 31 are substantially the same in shape, both having a semi-cylindrical shape and assembled together to form the supports 28, 29 in the form of a cylinder. The first and second support members 30, 31 have on inner peripheral surfaces 30A, 31A thereof projections 30B, 31B, respectively. The projections 30B, 31B of the first and second support members 30, 31 are disposed in engagement with the recesses 26, 27 of the first housing 17. The first and second support members 30, 31 are made of a material having good vibration damping properties such as resin or fiber reinforced resin.

The first support member 30 has at the opposite circumferential ends thereof first mountings 30C extending in tangential direction of the first support member 30. The second support member 31 also has at the opposite circumferential ends thereof second mountings 31C extending in tangential direction of the second support member 31. A metal insert 32 having therein a hole 32A is fitted as a reinforcement in each of the first and the second mountings 30C, 31C by insert molding. When the first and second support members 30, 31 are assembled together, the holes 32A of the first mountings 30C are connected coaxially to the associated holes 32A of the second mountings 31C, through which the bolts 14 are inserted for mounting of the first and second support members 30, 31 to the object 15.

There are provided first vibration dampers 33 between the recesses 26, 27 of the first housing 17 and the projections 30B of the first support members 30. There are also provided second vibration dampers 34 between the recesses 26, 27 of the first housing 17 and the projections 31B of the second support members 31. The first and second support members 30, 31 support the first housing 17 through the first and second vibration dampers 33, 34. As shown in FIG. 3, two pairs of the first vibration dampers 33 are disposed in the respective recesses 26, 27 while being curved, and similarly two pairs of the second vibration dampers 34 are disposed in the respective recesses 26, 27 while being curved. As seen in radial direction of the housing 13, the first vibration dampers 33 are disposed between the outer peripheral surface 17A of the first housing 17 and the first support member 30, and the second vibration dampers 34 are disposed between the outer peripheral surface 17A of the first housing 17 and the second support member 31. As seen in axial direction of the housing 13, the first vibration dampers 33 are disposed between the projection 30B of the first support member 30 and the ribs 22, 23 of the first housing 17 and between the projection 30B and the ribs 24, 25 of the first housing 17, and the second vibration dampers 34 are disposed between the projection 31B of the second support member 31 and the ribs 22, 23 and between the projection 31B and the ribs 24, 25. The first and second vibration dampers 33, 34 thus disposed are compressed and elastically deformed. The first and second vibration dampers 33, 34 are made of a rubber, specifically, a material having at least one of the thermal resistance and the durability such as silicone rubber or ethylene-propylene rubber. The first and second vibration dampers 33, 34 are in the form of a strip with a rectangular cross section. The first and second vibration dampers 33, 34 are combined together to extend over and cover the entire circumference of the outer peripheral surface 17A of the first housing 17.

Figure 4:
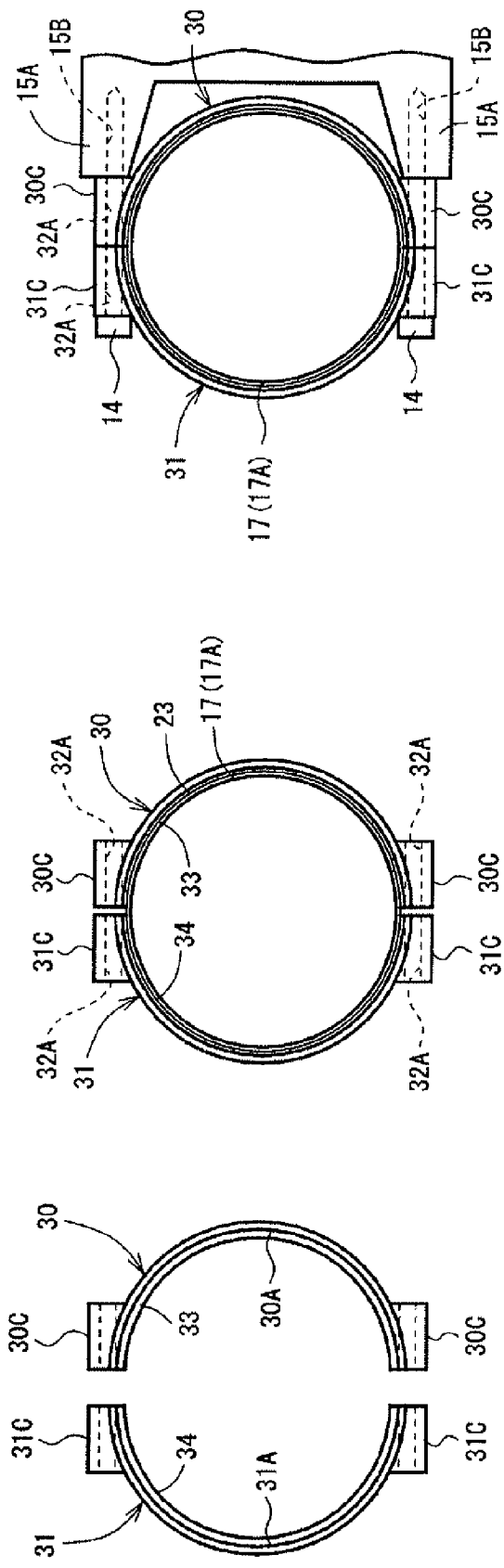
FIGS. 4A, 4B and 4C are schematic views explaining a procedure of mounting the compressor of FIG. 1.

The following will describe a procedure of mounting the motor-driven compressor 10 to the object 15 with reference to FIGS. 4A, 4B and 4C. Firstly, the first vibration dampers 33 are disposed on the inner peripheral surface 30A of the first support member 30 on the opposite sides of the projection 30B and fixed thereto by adhesive, as shown in FIG. 4A. Two sets of such first support member 30 integrated with the first vibration dampers 33 are prepared. In a similar manner, the second vibration dampers 34 are disposed on the inner peripheral surface 31A of the second support member 31 on the opposite side of the projection 31B and fixed thereto by adhesive. Two sets of such second support member 31 integrated with the second vibration dampers 34 are prepared.

Next, as shown in FIG. 4B, one of the first support members 30 with the first vibration dampers 33 is positioned on one side of the first housing 17 so that the projection 30B of the first support member 30 is engaged with the recess 26 of the first housing 17 through the first vibration dampers 33. Similarly, one of the second support members 31 with the second vibration dampers 34 is positioned on the other side of the first housing 17 so that the projection 31B of the second support member 31 is engaged with the recess 26 of the first housing 17 through the second vibration dampers 34. By doing so, the holes 32A of the first mounting 30C at the opposite ends of the first support member 30 are placed coaxially with the associated holes 32A of the second mounting 31C at the opposite ends of the second support member 31.

The other of the first support members 30 with the first vibration dampers 33 is positioned on one side of the first housing 17 so that the projection 30B of the first support member 30 is engaged with the recess 27 of the first housing 17 through the first vibration dampers 33. Similarly, the other of the second support members 31 with the second vibration dampers 34 is positioned on the other side of the first housing 17 so that the projection 31B of the second support member 31 is engaged with the recess 27 of the first housing 17 through the second vibration dampers 34. By doing so, the holes 32A of the first mounting 30C at the opposite ends of the first support member 30 are placed coaxially with the associated holes 32A of the second mounting 31C at the opposite ends of the second support member 31.

Then, as shown in FIG. 4C, with the first and second support members 30, 31 in the first pair assembled together, the bolts 14 are inserted through the holes 32A of the first and second mountings 30C, 31C of the respective first and second members 30, 31 and screwed into the threaded holes 15B in the projections 15A of the object 15. By doing so, the first mountings 30C come into contact with the associated second mountings 31C, so that the first and second vibration dampers 33, 34 are compressed radially.

With the first and second support members 30, 31 in the second pair assembled together, the bolts 14 are inserted through the holes 32A of the first and second mountings 30C, 31C of the respective first and second members 30, 31 and screwed into the threaded holes 15B in the projections 15A of the object 15. By doing so, the first mountings 30C come into contact with the associated second mountings 31C, so that the first and second vibration dampers 33, 34 are compressed radially.

In this way, the first and second support members 30, 31 of the respective supports 28, 29 are tightly coupled together, and the compressor 10 is fixedly mounted to the object 15 at two points by way of each support 28, 29, or at a total of four points by way of the two supports 28, 29. The first and second support members 30, 31 that are fixed to the object 15 by the bolts 14 support the first housing 17 through the first and second vibration dampers 33, 34. That is, neither the first support member 30 nor the second support member 31 is in direct contact with the first housing 17, but the first and second support members 30, 31 are indirectly connected to the first housing 17 through the first and second vibration dampers 33, 34.

Figure 5:
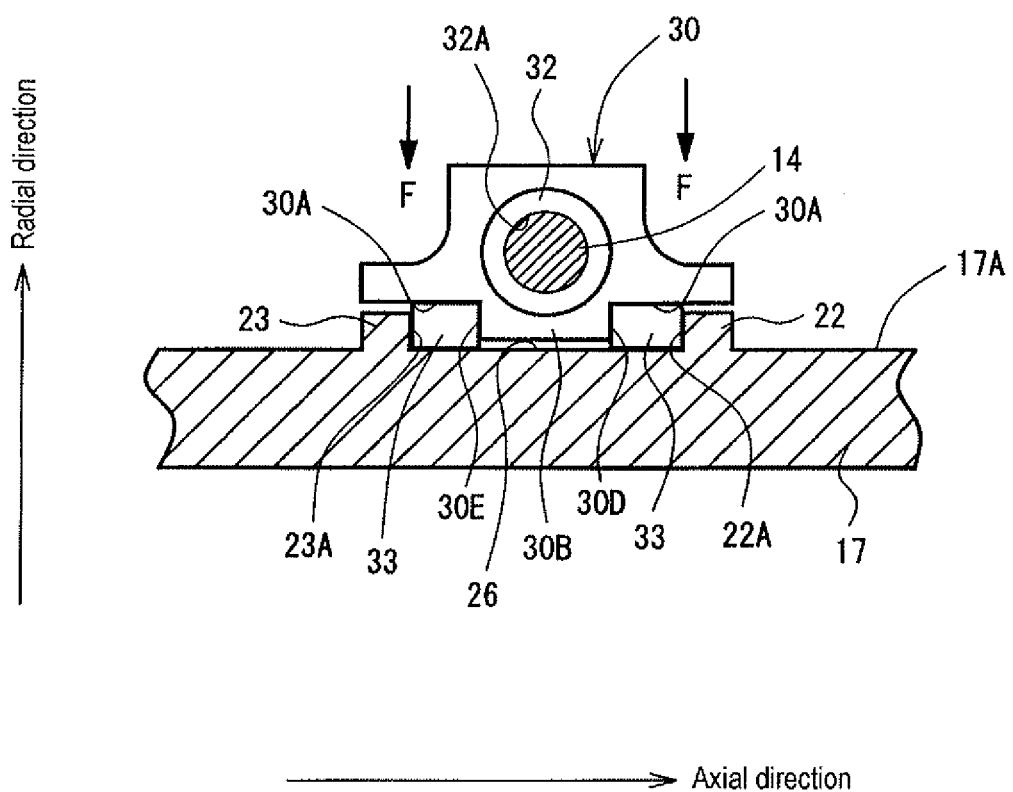
FIG. 5 is a partially-enlarged sectional view, showing a vibration damper and its related components of the compressor of FIGS. 1 and 2.

In the above-described compressor 10, as shown in FIG. 5, the first vibration dampers 33 are disposed between the recess 26 of the first housing 17 and the projection 30B of the first support member 30 while receiving radial compression load and being elastically deformed. The load acting on the first vibration dampers 33, which is designated by symbol F, causes the first vibration dampers 33 to be expanded in axial direction of the compressor 10 between the inner peripheral surface 30A of the first support member 30 and the bottom of the recess 26 or the outer peripheral surface 17A of the first housing 17 and hence to be pressed against the inner surfaces 22A, 23A of the ribs 22, 23 and also against the side surfaces 30D, 30E of the projection 30B. In this case, gaps are formed between the inner peripheral surface 30A of the first support member 30 and the ribs 22, 23 and also between the projection 30B of the first support member 30 and the outer peripheral surface 17A of the first housing 17 and, therefore, there is no direct contact between the first support member 30 and the first housing 17. The first vibration dampers 33 thus disposed between the first housing 17 and the first support member 30 allows reduction of the radial and axial vibration of the compressor 10 in operation. The same is true of the first vibration dampers 33 disposed between the recess 27 of the first housing 17 and the projection 30B of the first support member 30, and also of the second vibration dampers 34 disposed between the recesses 26, 27 of the first housing 17 and the projection 31B of the second support member 31, and the description of such components will be omitted.

The recesses 26, 27 are disposed on the outer peripheral surface 17A of the first housing 17 of the compressor 10 at the positions associated with the compression mechanism 11 and the electric motor 12. The first and second vibration dampers 33, 34 are disposed in the recesses 26, 27 and extend over and cover the entire circumference of the outer peripheral surface 17A of the first housing 17. While the compressor 10 is operating, the vibration generated by the compression mechanism 11 is absorbed mainly by the first and second vibration dampers 33, 34 disposed in the recess 27, and the vibration generated by the electric motor 12 is absorbed mainly by the first and second vibration dampers 33, 34 disposed in the recess 26, resulting in an effective reduction of the vibration generated by the compression mechanism 11 and the electric motor 12.

After the first support members 30 with the first vibration dampers 33 and the second support members 31 with the second vibration dampers 34 are assembled together, the bolts 14 are inserted through the holes 32A of the first and second mountings 30C, 31C of the respective first and second members 30, 31 and screwed into the threaded holes 15B of the projection 15A of the object 15. Mounting of the first and second support members 30, 31 to the first housing 17 of the compressor 10 is performed simultaneously with mounting of the first and second support members 30, 31 to the object 15, allowing easy installation of the compressor 10.

The cylindrical supports 28, 29 each formed by the semicylindrical first and second support members 30, 31 are disposed extending over and covering the entire circumference of the outer peripheral surface 17A of the first housing 17 of the compressor 10, allowing a stable support of the first housing 17 or the housing 13.

The motor-driven compressor 10 of the first embodiment offers the following advantages.

(1) The first vibration dampers 33 are disposed between the recesses 26, 27 of the first housing 17 and the projections 30B of the first support members 30 while receiving radial compression load F and being elastically deformed. The load F causes the first vibration dampers 33 to be expanded in axial direction of the compressor 10 between the inner peripheral surfaces 30A of the first support members 30 and the bottoms of the recesses 26, 27 or the outer peripheral surface 17A of the first housing 17 and hence to be pressed against the inner surfaces 22A, 23A, 24A, 25A of the ribs 22, 23, 24, 25 and also against the side surfaces 30D, 30E of the projections 30B. The second vibration dampers 34 are disposed between the recesses 26, 27 of the first housing 17 and the projections 31B of the second support members 31 while receiving radial compression load F and being elastically deformed. The load F causes the second vibration dampers 34 to be expanded in axial direction of the compressor 10 between the inner peripheral surfaces 31A of the second support members 31 and the bottoms of the recesses 26, 27 or the outer peripheral surface 17A of the first housing 17 and hence to be pressed against the inner surfaces 22A, 23A, 24A, 25A of the ribs 22, 23, 24, 25 and also against the side surfaces of the projections 31B. In addition, the first and second vibration dampers 33, 34 are disposed extending over and covering the entire circumference of the outer peripheral surface 17A of the first housing 17, thereby effectively preventing radial, axial and circumferential vibrations of the compressor 10.

(2) The recesses 26, 27 are disposed on the outer peripheral surface 17A of the first housing 17 of the compressor 10 at the positions associated with the compression mechanism 11 and the electric motor 12. The first and second vibration dampers 33, 34 are disposed in the recesses 26, 27. While the compressor 10 is operating, the vibration generated by the compression mechanism 11 is absorbed mainly by the first and second vibration dampers 33, 34 disposed in the recess 27, and the vibration generated by the electric motor 12 is absorbed mainly by the first and second vibration dampers 33, 34 disposed in the recess 26, resulting in an effective reduction of the vibration generated by the compression mechanism 11 and the electric motor 12.

(3) The first and second support members 30, 31 support the first housing 17 through the first and second vibration dampers 33, 34 interposed between the recesses 26, 27 of the first housing 17 and the projections 30B, 31B of the first and second support members 30, 31 which are in engagement with each other. Vibration transmission from the compression mechanism 11 and the electric motor 12 through the first housing 17 to the object 15 is prevented. Mounting the first and second mounting 30C, 31C of the first and second support members 30, 31 to the object 15 by the bolts 14 with the first and second vibration dampers 33, 34 interposed between the first housing 17 and the first and second support members 30, 31 as described above, the compressor 10 can be easily installed to the object 15.

(4) After the first support members 30 with the first vibration dampers 33 and the second support members 31 with the second vibration dampers 34 are assembled together, the bolts 14 are inserted through the holes 32A of the first and second mountings 30C, 31C of the respective first and second members 30, 31 and screwed into the threaded holes 15B of the projection 15A of the object 15. Mounting of the first and second support members 30, 31 to the first housing 17 of the compressor 10 is performed simultaneously with mounting of the first and second support members 30, 31 to the object 15, allowing easy installation of the compressor 10.

(5) The use of the cylindrical supports 28, 29 each formed by the semi-cylindrical first and second support members 30, 31 and disposed extending over and covering the entire circumference of the outer peripheral surface 17A of the first housing 17 of the compressor 10 allows stable support of the first housing 17 and easy installation of the supports 28, 29 to the first housing 17. The cylindrical supports 28, 29 also help to prevent an increase of the size of the compressor 10.

(6) The first and second support members 30, 31 are disposed covering the outer peripheral surface 17A of the first housing 17 at least at the positions where the first and second vibration dampers 33, 34 are mounted, which helps to protect the first and second vibration dampers 33, 34.

(7) The first and second vibration dampers 33, 34 made of a rubber material in the form of a square strip are easily manufacturable.

(8) The first and second vibration dampers 33, 34 are made of a material having at least one of the thermal resistance and the durability such as silicone rubber or ethylene-propylene rubber. The use of the damper with high thermal resistance allows the compressor 10 to be used under a high-temperature environment. The damper with high durability is less susceptible to deterioration when used over a long period of time while receiving compression load and being elastically deformed and, therefore, formation of a gap between the recesses 26, 27 and the damper and between the projections 30B, 31B and the damper is prevented.

(9) Any worn vibration damper 33, 34 may be replaced easily with a new one, resulting in less time for maintenance.

(10) The metal inserts 32 each having the hole 32A and fitted in the respective first and second mountings 30C, 31C of the first and second support members 30, 31 by insert molding serve to prevent the first and second mountings 30C, 31C from being broken due to the load acting on the first and second support members 30, 31 mounted to the object 15.

(11) The first and second support members 30, 31 made of a resin or fiber reinforced resin provide good vibration damping.

(12) The first and second mountings 30C, 31C which are to be mounted to the object 15 are formed as unitary parts of the supports 28, 29 that are separate from the housing 13, which makes it easier to provide the mounting as compared to the case where such mounting is formed on the housing 13. The shape or position of the mounting is adjustable depending on the shape or position of the object 15, resulting in an increased freedom of the mounting of the compressor 10.

(13) The first and second mountings 30C, 31C which are to be mounted to the object 15 are formed not on the housing 13 in which the compression mechanism 11 and the electric motor 12 are accommodated, but as unitary parts of the supports 28, 29, which makes it possible to form the housing 13 into a simple shape.

FIGS. 6, 7, 8A and 8B show the second embodiment of the motor-driven compressor according to the present invention. The second embodiment differs from the first embodiment in the structure of the support. In the drawings, same reference numerals are used for the common elements or components in the first and the second embodiments, and the description of such elements or components of the second embodiment will be omitted.

Figure 6:
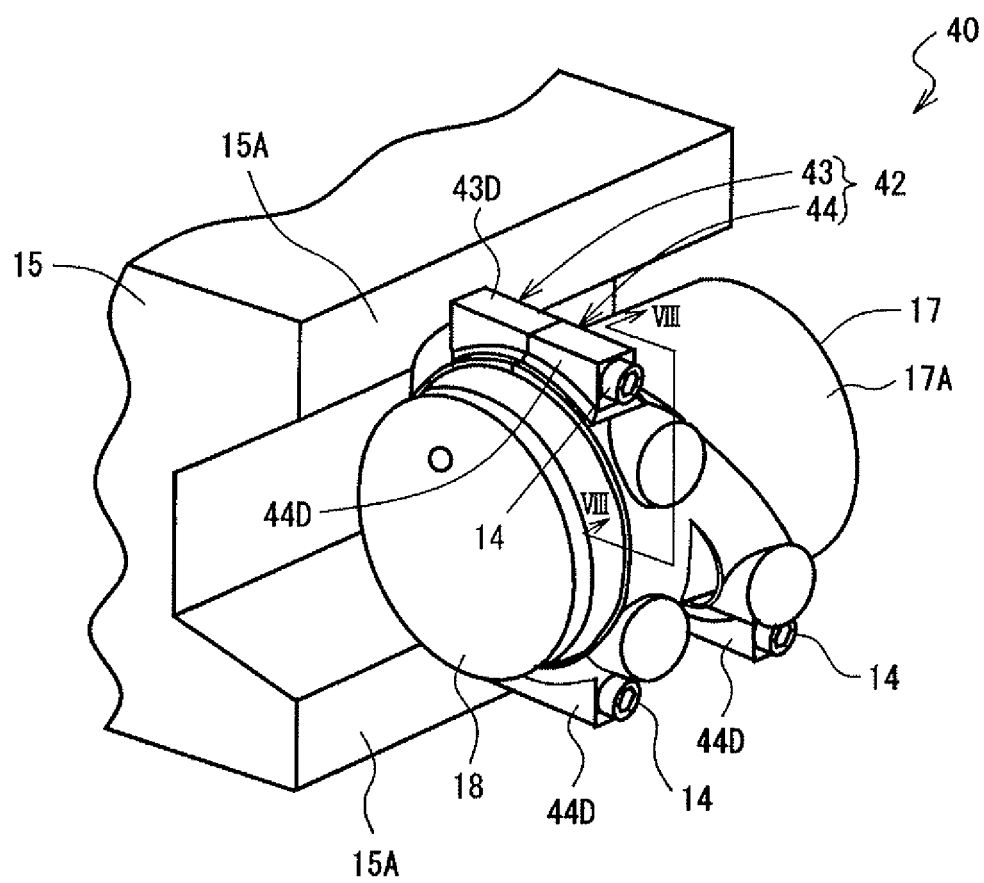
FIG. 6 is a perspective view of a second embodiment of the compressor acceding to the present invention.

As shown in FIG. 6, the motor-driven compressor which is designated generally by 40 has a support 42 that is mounted to the projections 15A of the object 15 by three bolts 14. The support 42 includes a first support member 43 and a second support member 44, through which the bolts 14 are inserted and screwed into the associated three threaded holes formed in the projections 15A of the object 15. As shown in FIG. 7, the first housing 17 has on its outer peripheral surface 17A six projections 41, three of which are on the first side of the outer peripheral surface 17A of the first housing 17 that faces the object 15 and the other three of which are on the second side of the outer peripheral surface 17A that is opposite from the first side. The arrangement of the projections 41 on the first side of the first housing 17 and the projections 41 on the second side is symmetric with respect to the vertical plane containing the longitudinal axis of the first housing 17. The projections 41 disposed on the first side of the first housing 17 are in the form of a cylinder and project toward the object 15, while the projections 41 disposed on the second side of the first housing 17 are also in the form of a cylinder and project in opposite direction, or away from the object 15. Each projection 41 has therein a recess 41A having a round cross section and extending in the direction in which the bolt 14 is tightened. The recesses 41A of the projections 41 are disposed on the outer peripheral surface 17A of the first housing 17 at positions associated with the compression mechanism 11 and the electric motor 12.

The first and second support members 43, 44 are disposed extending over and covering the entire circumference of the outer peripheral surface 17A of the first housing 17. The first and second support members 43, 44 are symmetric about the aforementioned vertical plane. The first support member 43 has generally a semi-cylindrical shape and is disposed covering the circumferential surface on the first side of the first housing 17. The first support member 43 has at one circumferential end thereof a top 46 and at the other circumferential end thereof two branched legs 47. The second support member 44 has generally a semi-cylindrical shape and is disposed covering the second side of the first housing 17. The second support member 44 has at one circumferential end thereof a top 48 and at the other circumferential end thereof two branched legs 49. The first and second support members 43, 44 are assembled together to form the support 42 in the form of a cylinder.

Figure 8A:
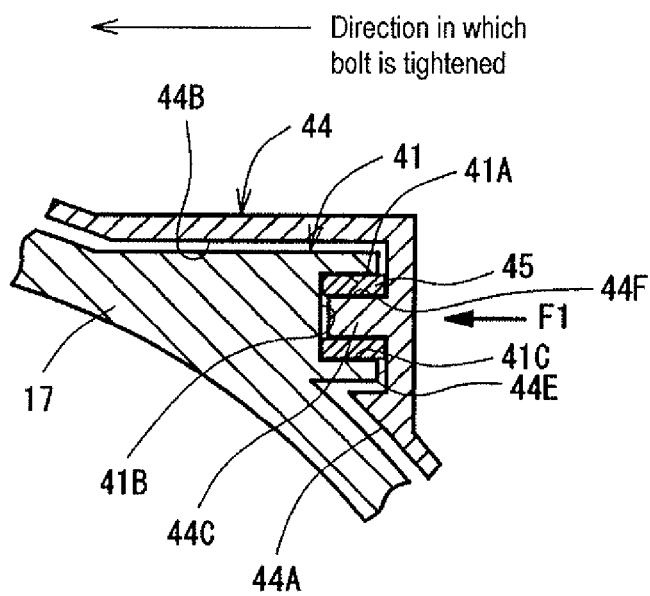
FIGS. 8A and 8B are partially-enlarged sectional views taken along the line VIII-VIII of FIG. 6.
Figure 8B:
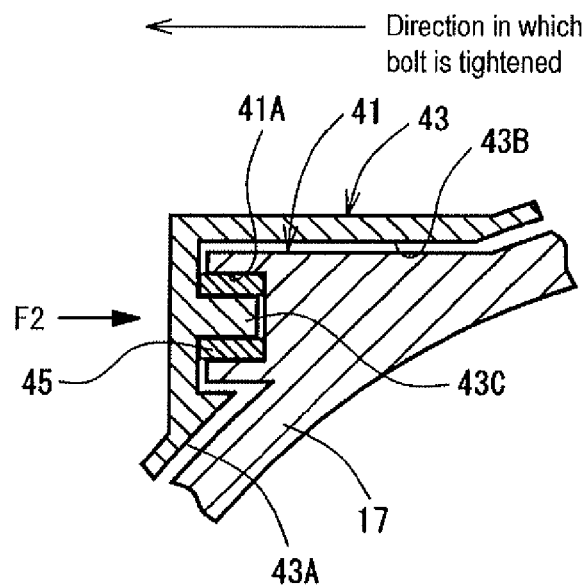

As shown in FIG. 7, the first support member 43 has on its inner peripheral surface 43A three recesses 43B each having on its bottom a cylindrical central projection 43C. FIG. 8B shows a cross section of the recess 43B disposed adjacent to the top 46 of the first support member 43. Although not shown in FIG. 7, the second support member 44 also has on its inner peripheral surface 44A three recesses 44B each having on its bottom a cylindrical central projection 44C. FIG. 8A shows a cross section of the recess 44B disposed adjacent to the top 48 of the second support member 44. The projections 43C of the first support member 43 are disposed in engagement with the associated recesses 41A on the first side of the first housing 17, while the projections 44C of the second support member 44 are disposed in engagement with the associated recesses 41A on the second side of the first housing 17. The first and second support members 43, 44 are made of a material having good vibration damping properties, such as a resin or fiber reinforced resin.

The first support member 43 has on the top 46 and the legs 47 thereof first mountings 43D extending in tangential direction of the first support member 43. The second support member 44 also has on the top 48 and the legs 49 thereof second mountings 44D extending in tangential direction of the second support member 44. The metal insert 32 having the hole 32A is fitted by insert molding in each of the first and second mountings 43D, 44D. When the first and second support members 43, 44 are assembled together, the holes 32A of the first mountings 43D are aligned coaxially to their associated holes 32A of the second mountings 44D, through which the bolts 14 are inserted for mounting the compressor to the object 15. The projections 43C of the first support member 43 are disposed adjacent to the respective first mountings 43D. The projections 44C of the second support member 44 are disposed adjacent to the respective second mountings 44D. That is, the first support member 43 has the three projections 43C adjacent to the respective first mountings 43D, and the second support member 44 has the three projections 44C adjacent to the respective second mountings 44D. The projections 43C, 44C both extend in the direction in which the bolt 14 is tightened.

There are provided three vibration dampers 45 each disposed between the recess 41A on the first side of the first housing 17 and the projection 43C of the first support member 43. There are also provided three vibration dampers 45 each disposed between the recess 41A on the second side of the first housing 17 and the projection 44C of the second support member 44. The first and second support members 43, 44 support the first housing 17 through the vibration dampers 45. The vibration damper 45 is made of a rubber, specifically, the material having at least one of the thermal resistance and the durability, such as silicone rubber or ethylene-propylene rubber. The vibration damper 45 has an annular shape with an axial hole 45A. The vibration dampers 45 are previously fitted onto the projections 43C, 44C of the first and second support members 43, 44 and integrated therewith prior to the mounting of the first and second support members 43, 44 to the first housing 17.

The following will describe a procedure of mounting the motor-driven compressor 40 to the object 15. Firstly, the vibration dampers 45 are fitted onto the projections 43C, 44C of the first and second support members 43, 44 and integrated therewith. Next, the first support member 43 with the vibration dampers 45 is positioned on the first side of the first housing 17 so that the projections 43C of the first support member 43 are engaged with the associated recesses 41A of the first housing 17. Similarly, the second support member 44 with the vibration dampers 45 is positioned on the second side of the first housing 17 so that the projections 44C of the second support member 44 are engaged with the associated recesses 41A of the first housing 17. By doing so, the holes 32A of the first mountings 43D at the top 46 and the legs 47 of the first support member 43 are coaxially aligned to the associated holes 32A of the second mountings 44D at the top 48 and the legs 49 of the second support member 44.

Then, with the first and second support members 43, 44 thus combined together, the bolts 14 are inserted through the holes 32A of the first and second mountings 43D, 44D of the respective first and second support members 43, 44 and screwed into the threaded holes of the projections 15A of the object 15. By doing so, the first mountings 43D come into contact with the associated second mountings 44D, so that the vibration dampers 45 are compressed in the direction in which the bolt 14 is tightened.

In this way, the first and second support members 43, 44 are tightly coupled together, and the compressor 40 is fixedly mounted to the object 15 at three points. The first and second support members 43, 44 fixed to the object 15 by the bolts 14 support the first housing 17 through the vibration dampers 45. That is, the first and second support members 43, 44 are indirectly connected to the first housing 17 through the vibration dampers 45, but neither the first support member 43 nor the second support member 44 is in direct contact with the first housing 17.

In the above-described compressor 40, as shown in FIG. 8A, the recess 41A in the projection 41 of the first housing 17 and the projection 44C of the second support member 44 are formed extending in the direction in which the bolt 14 is tightened. The vibration damper 45 disposed between the recess 41A and the projection 44C receive compression load in the direction in which the bolt 14 is tightened, so that the vibration damper 45 is elastically deformed.

The load acting on the vibration dampers 45, which is designated by F1, causes the vibration damper 45 to be radially expanded between the bottom 44E of the recess 44B of the second support member 44 and the bottom 41B of the recess 41A and hence to be pressed against the inner surface 41C of the recess 41A and the outer peripheral surface 44F of the projection 44C. In this case, gaps are formed between the bottom 44E of the recess 44B of the second support member 44 and the projection 41 of the first housing 17 and also between the projection 44C of the second support member 44 and the bottom 41B of the recess 41A of the first housing 17 and, therefore, there is no direct contact between the second support member 44 and the first housing 17. The vibration damper 45 thus disposed between the first housing 17 and the second support member 44 allows reduction of the radial, circumferential and axial vibration of the compressor 40. As shown in FIG. 8B, the vibration damper 45 disposed between the recess 41A of the projection 41 of the first housing 17 and the projection 43C of the first support member 43 receives compression load which is designated by F2. The magnitude of the load F2 is substantially the same as that of the load F1, but the load F2 acts on the vibration damper 45 in the direction opposite to the direction in which the bolt 14 is tightened.

The recesses 41A of the projections 41 are disposed on the outer peripheral surface 17A of the first housing 17 of the compressor 40 at the positions associated with the compression mechanism 11 and the electric motor 12. While the compressor 40 is operating, the vibration generated by the compression mechanism 11 is absorbed mainly by the four vibration dampers 45 disposed in the respective four recesses 41A of the first housing 17 which are closer to the second housing 18, and the vibration generated by the electric motor 12 is absorbed mainly by the two vibration dampers 45 disposed in the other two recesses 41A of the first housing 17, resulting in an effective reduction of the vibration generated by the compression mechanism 11 and the electric motor 12. It is noted that, although in the second embodiment the first housing 17 has the three recesses 41A on each of the first and second sides thereof and hence a total of six recesses 41A, the number and the position of the recesses 41A may be changed depending on the vibration characteristics of the compressor 40. In addition, the recess 41A of the projection 41 on the outer peripheral surface 17A of the first housing 17 has a round cross section and is easily manufacturable. Such recesses 41A can be formed at one time, for example, by die casting, which leads to a high accuracy of dimension. The vibration damper 45 having an annular shape is also easily manufacturable. Furthermore, the first and second support members 43, 44 are disposed covering the outer peripheral surface 17A of the first housing 17 at the positions associated with the vibration dampers 45, which helps to protect the vibration dampers 45. The second embodiment also offers the advantages similar to the advantages (3) to (6) and (8) to (13) of the first embodiment.

FIGS. 9, 10, 11 and 12 show the third embodiment of the motor-driven compressor according to the present invention. The third embodiment differs from the first embodiment in the structure of the support. In the drawings, same reference numerals are used for the common elements or components in the first and the third embodiments, and the description of such elements or components of the third embodiment will be omitted.

Figure 9:
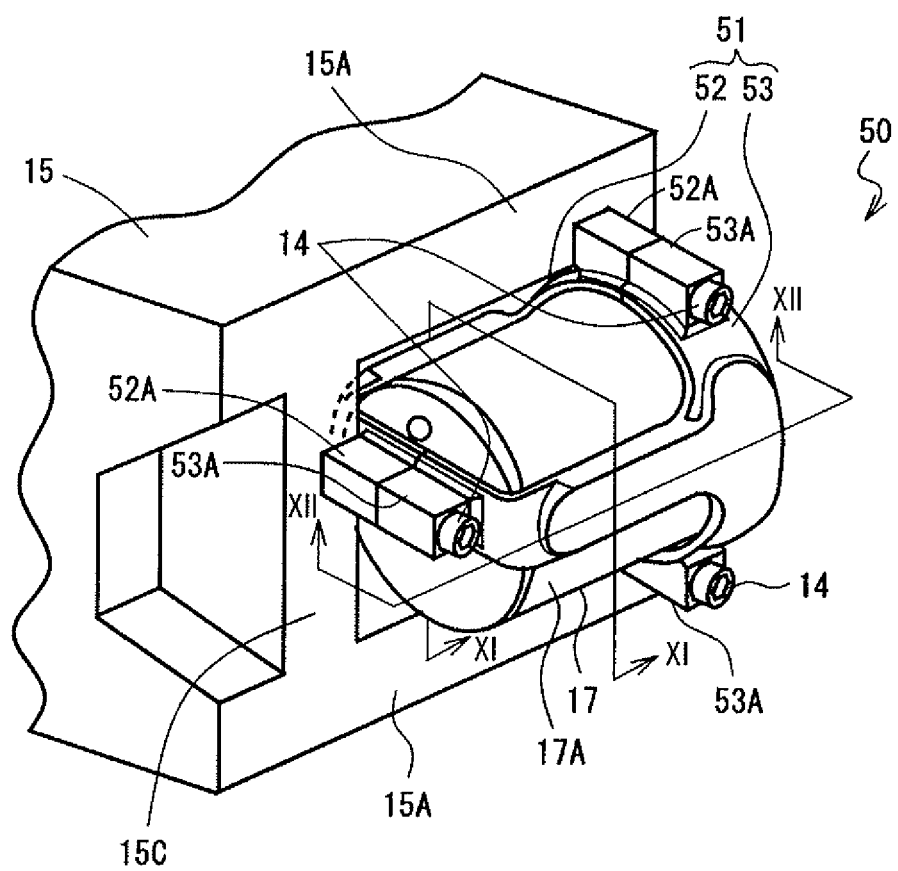
FIG. 9 is a perspective view of a third embodiment of the compressor according to the present invention.
Figure 10:
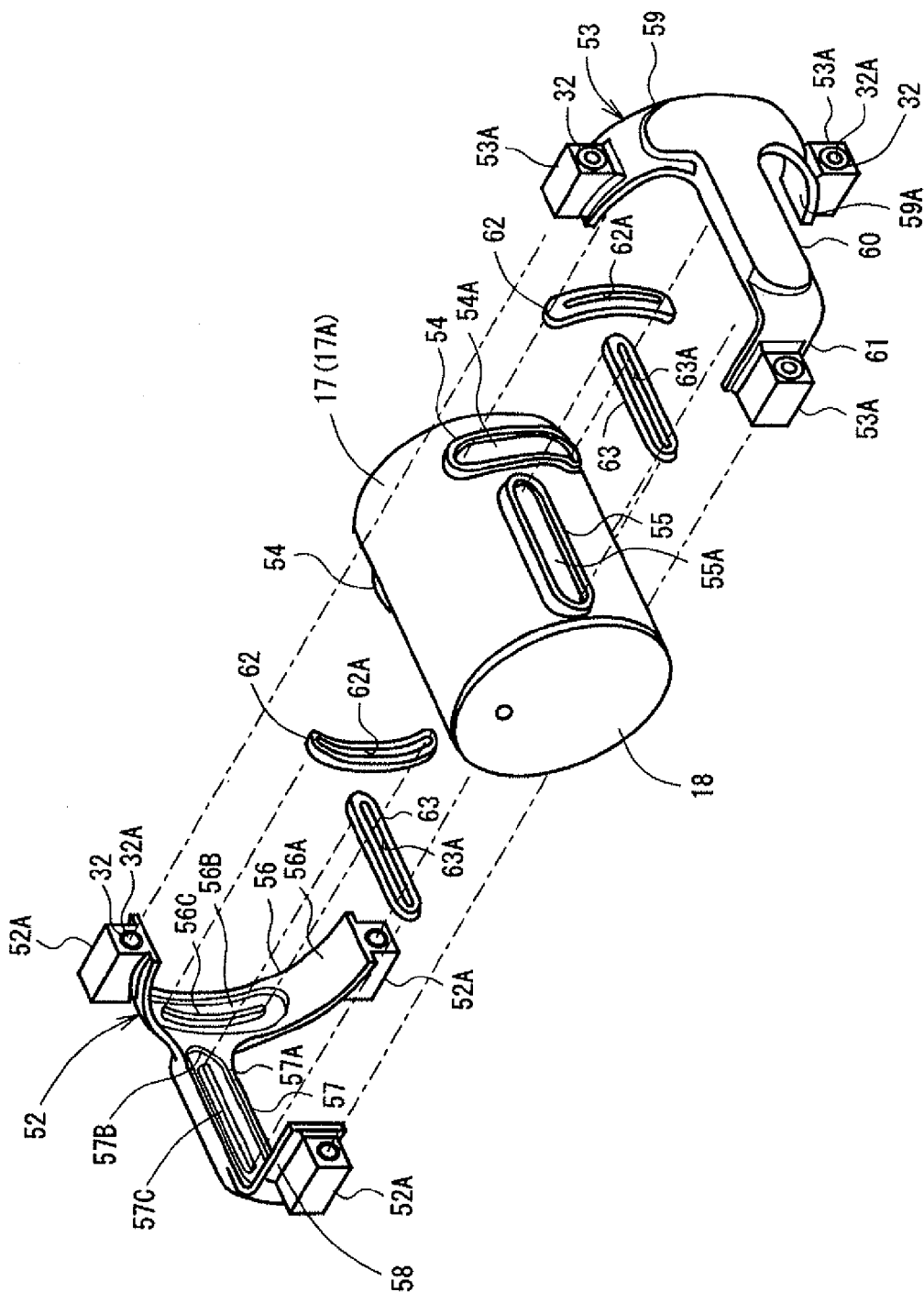
FIG. 10 is an exploded perspective view of the compressor of FIG. 9.

As shown in FIG. 9, the motor-driven compressor which is designated generally by 50 has a support 51. The object 15 to which the compressor 50 is mounted has the two projections 15A projecting laterally toward the compressor 50 and also has two projections 15C connecting the projections 15A. The support 51 includes a first support member 52 and a second support member 53, through which three bolts 14 are inserted and screwed into the associated three threaded holes formed in the projections 15A, 15C of the object 15. As shown in FIG. 10, the first housing 17 has on its outer peripheral surface 17A two projections 54 and two projections 55. One set of the projections 54, 55 is disposed on the first side of the outer peripheral surface 17A of the first housing 17 that faces the object 15 and the other set of the projections 54, 55 is disposed on the second side of the outer peripheral surface 17A that is opposite from the first side. These two sets of the projections 54, 55 are symmetric with respect to the vertical plane containing the longitudinal axis of the first housing 17. The projection 54 disposed on the first side of the first housing 17 projects toward the object 15 and extends circumferentially along the outer peripheral surface 17A of the first housing 17. The projection 54 disposed on the second side of the first housing 17 projects in opposite direction or away from the object 15 and extends circumferentially along the outer peripheral surface 17A of the first housing 17. Each projection 54 has a recess 54A having an oval cross section. The projection 55 disposed on the first side of the first housing 17 projects toward the object 15 and extends axially on the outer peripheral surface 17A of the first housing 17. The projection 55 disposed on the second side of the first housing 17 projects in opposite direction or away from the object 15 and extends axially on the outer peripheral surface 17A of the first housing 17. Each projection 55 has a recess 55A having an oval cross section. The recesses 54A are disposed on the outer peripheral surface 17A of the first housing 17 at the positions associated with the electric motor 12, while the recesses 55A are disposed on the outer peripheral surface 17A of the first housing 17 at the positions associated with the compression mechanism 11.

The first and second support members 52, 53 are disposed extending over and covering the entire circumference of the outer peripheral surface 17A of the first housing 17. The first and second support members 52, 53 are substantially the same in shape. The first support member 52 is disposed covering the first side of the first housing 17, while the second support member 53 is disposed covering the second side of the first housing 17. The first support member 52 has a generally semi-cylindrical arm 56 and a body 57 extending axially from the arm 56. The end of the body 57 opposite from the arm 56 is bent along the end of the second housing 18 to form a bend 58. The second support member 53 also has a generally semi-cylindrical arm 59 and a body 60 extending axially from the arm 59. The end of the body 60 opposite from the arm 59 is bent along the end of the second housing 18 to form a bend 61. The first and second support members 52, 53 are assembled together to form the support 51 in the form of a cylinder.

Figure 11:
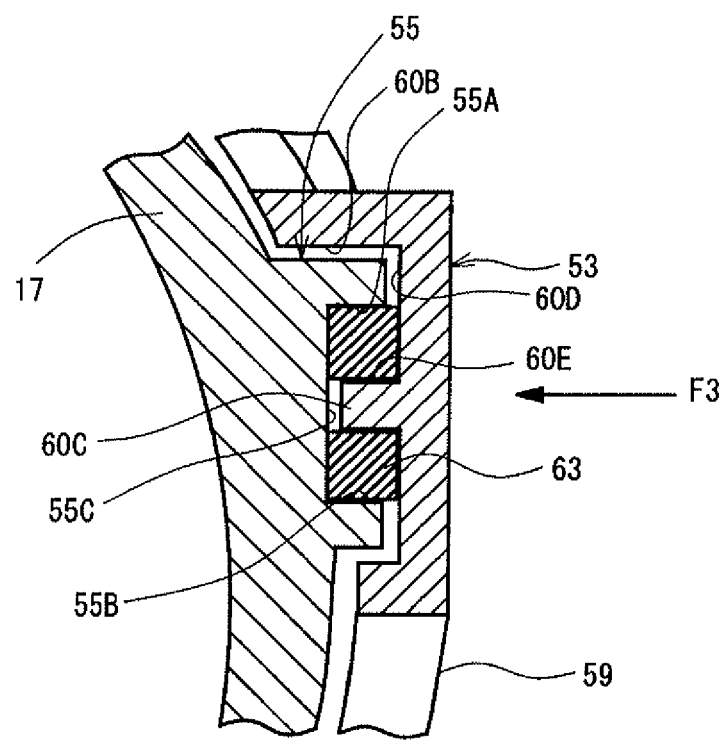
FIG. 11 is a partially-enlarged sectional view taken along the line XI-XI of FIG. 9.
Figure 12:
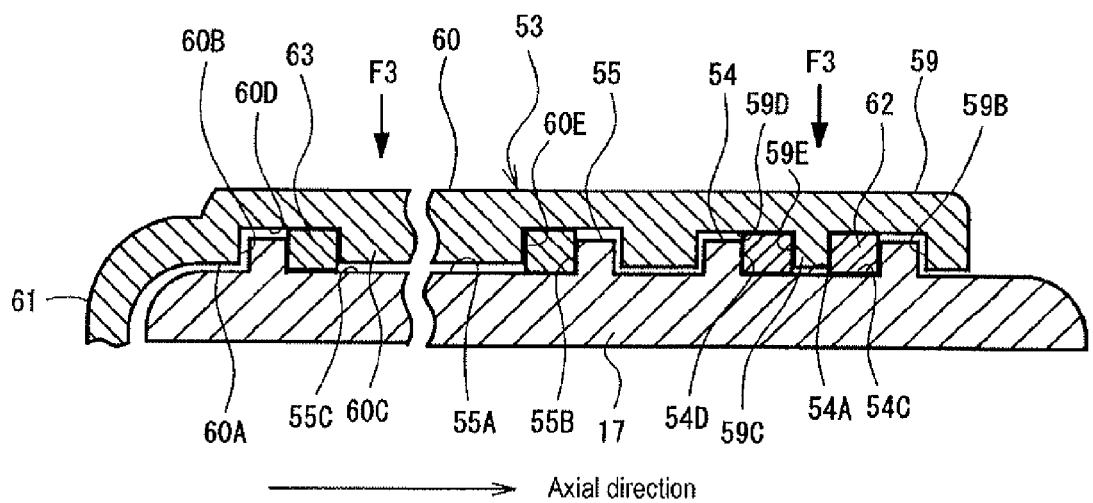
FIG. 12 is a partially-enlarged sectional view taken along the line XII-XII of FIG. 9.

The arm 56 of the first support member 52 has on its inner peripheral surface 56A a recess 56B having on its bottom a projection 56C. The body 57 of the first support member 52 has on its inner peripheral surface 57A a recess 57B having on its bottom a projection 57C. The projection 56C extends circumferentially, while the projection 57C extends axially. Similarly, the arm 59 of the second support member 53 has on its inner peripheral surface 59A a recess 59B having on its bottom a projection 59C. The body 60 of the second support member 53 has on its inner peripheral surface 60A a recess 60B having on its bottom a projection 60C. The projection 59C extends circumferentially, while the projection 60C extends axially. FIG. 11 shows the recess 60B and its associated projection 60C. FIG. 12 shows the recesses 59B, 60B and their associated projections 59C, 60C.

The projections 56C, 57C of the first support member 52 are disposed in engagement with their associated recesses 54A, 55A on the first side of the first housing 17, while the projections 59C, 60C of the second support member 53 are disposed in engagement with their associated recesses 54A, 55A on the second side of the first housing 17. The first and second support members 52, 53 are made of a material having good vibration damping properties, such as resin or fiber reinforced resin.

The first support member 52 has at the opposite circumferential ends of the arm 56 thereof first mountings 52A extending tangentially to the arm 56 of the first support member 52.

The first support member 52 also has at the bend 58 thereof a first mounting 52A projecting away from the second housing 18. Similarly, the second support member 53 has at the opposite circumferential ends of the arm 59 thereof second mountings 53A extending tangentially to the arm 59 of the second support member 53. The second support member 53 also has at the bend 61 thereof a second mounting 53A projecting away from the second housing 18. Each of the first and second mountings 52A, 53A has the metal insert 32 fitted therein by insert molding. When the first and second support members 52, 53 are assembled together, the holes 32A of the first mountings 52A and the associated holes 32A of the second mountings 53A are aligned coaxially, through which the bolts 14 are inserted for mounting the compressor to the object 15.

There are provided vibration dampers 62 between the recesses 54A on the first side of the first housing 17 and the projection 56C of the first support member 52 and also between the recesses 54A on the second side of the first housing 17 and the projection 59C of the second support member 53. There are also provided vibration dampers 63 between the recesses 55A on the first side of the first housing 17 and the projection 57C of the first support member 52 and also between the recesses 55A on the second side of the first housing 17 and the projection 60C of the second support member 53. The projections 56C, 57C of the first support member 52 are disposed in engagement with the associated recesses 54A, 55A of the first housing 17 through the vibration dampers 62, 63. The projections 59C, 60C of the second support member 53 are disposed in engagement with the associated recesses 54A, 55A of the first housing 17 through the vibration dampers 62, 63. The vibration damper 62 has an oval shape with a slit 62A. The vibration dampers 62 are previously fitted over the projections 56C, 59C of the first and second support members 52, 53 prior to the mounting of the first and second support members 52, 53 to the first housing 17. The vibration damper 63 also has an oval shape with a slit 63A. The vibration dampers 63 are previously fitted over the projections 57C, 60C of the first and second support members 52, 53 prior to the mounting of the first and second support members 52, 53 to the first housing 17. The vibration dampers 62, 63 are made of a planar rubber material, specifically, a material having at least one of the thermal resistance and the durability, such as silicone rubber or ethylene-propylene rubber.

The following will describe a procedure of mounting the motor-driven compressor 50 to the object 15. Firstly, the vibration dampers 62, 63 are fitted onto the projections 56C, 57C, 59C, 60C of the first and second support members 52, 53 and integrated therewith. Next, the first support member 52 with the vibration dampers 62, 63 is positioned on the first side of the first housing 17 so that the projections 56C, 57C of the first support member 52 are engaged with the associated recesses 54A, 55A of the first housing 17. Similarly, the second support member 53 with the vibration dampers 62, 63 is positioned on the second side of the first housing 17 so that the projections 59C, 60C of the second support member 53 are engaged with the associated recesses 54A, 55A of the first housing 17. By doing so, the holes 32A of the first mountings 52A at the opposite ends of the arm 56 and at the end of the bend 58 of the first support member 52 are coaxially aligned to the associated holes 32A of the second mountings 53A at the opposite ends of the arm 59 and at the end of the bend 61 of the second support member 53.

Then, with the first and second support members 52, 53 thus combined together, the bolts 14 are inserted through the holes 32A of the first and second mountings 52A, 53A of the respective first and second support members 52, 53 and screwed into the threaded holes of the projections 15A, 15C of the object 15. By doing so, the first mountings 52A come into contact with the associated second mountings 53A, so that the vibration dampers 62, 63 are compressed in the direction in which the bolt 14 is tightened.

In this way, the first and second support members 52, 53 are tightly coupled together, and the compressor 50 is fixedly mounted to the object 15 at three points. The first and second support members 52, 53 fixed to the object 15 by the bolts 14 support the first housing 17 through the vibration dampers 62, 63. That is, the first and second support members 52, 53 are indirectly connected to the first housing 17 through the vibration dampers 62, 63, but neither the first support member 52 nor the second support member 53 is in direct contact with the first housing 17.

In the above-described compressor 50, as shown in FIG. 11, the vibration damper 63 disposed between the recess 55A of the projection 55 of the first housing 17 and the projection 60C of the second support member 53 receive radial compression load, so that the vibration damper 63 is elastically deformed. The load acting on the vibration damper 63, which is designated by F3, causes the vibration damper 63 to be radially and circumferentially expanded between the bottom 60D of the recess 60B of the second support member 53 and the bottom 55C of the recess 55A of the first housing 17 and hence to be pressed against the inner surface 55B of the recess 55A and the outer peripheral surface 60E of the projection 60C. In this case, gaps are formed between the bottom 60D of the recess 60B of the second support member 53 and the projection 55 of the first housing 17 and also between the projection 60C of the second support member 53 and the bottom 55C of the recess 55A of the first housing 17 and, therefore, there is no direct contact between the second support member 53 and the first housing 17. The vibration damper 63 thus disposed between the first housing 17 and the second support member 53 allows reduction of the radial and circumferential vibration of the compressor 50. As shown in FIG. 12, the vibration damper 63 is also axially expanded between the bottom 60D of the recess 60B of the second support member 53 and the bottom 55C of the recess 55A of the first housing 17 and hence to be pressed against the inner surface 55B of the recess 55A and the outer peripheral surface 60E of the projection 60C, so that the vibration damper 63 also allows reduction of the axial vibration of the compressor 50.

As shown in FIG. 12, the vibration damper 62 is axially expanded between the bottom 59D of the recess 59B of the second support member 53 and the bottom 54C of the recess 54A of the first housing 17 and hence to be pressed against the inner surface 54D of the recess 54A and the outer peripheral surface 59E of the projection 59C. Although not shown in the drawing, the vibration damper 62 is also circumferentially expanded between the bottom 59D of the recess 59B of the second support member 53 and the bottom 54C of the recess 54A of the first housing 17 and hence to be pressed against the inner surface 54D of the recess 54A and the outer peripheral surface 59E of the projection 59C. Thus, the vibration damper 62 allows reduction of the radial, circumferential and axial vibration of the compressor 50. The same is true of the vibration dampers 62, 63 disposed between the first housing 17 and the first support member 52, and the description of such components will be omitted.

The recesses 54A, 55A of the projections 54, 55 are disposed on the outer peripheral surface 17A of the first housing 17 of the compressor 50 at the positions associated with the compression mechanism 11 and the electric motor 12. While the compressor 50 is operating, the vibration generated by the compression mechanism 11 is absorbed mainly by the vibration dampers 63 disposed in the recesses 55A of the first housing 17, and the vibration generated by the electric motor 12 is absorbed mainly by the vibration dampers 62 disposed in the recesses 54A of the first housing 17, resulting in an effective reduction of the vibration generated by the compression mechanism 11 and the electric motor 12. In addition, the recess 54A, 55A of the projections 54, 55 on the outer peripheral surface 17A of the first housing 17 have an oval cross section and are easily manufacturable. Such recesses 54A, 55A can be formed at one time, for example, by die casting, which leads to a high accuracy of dimension. The vibration dampers 62, 63 having an oval shape is also easily manufacturable. The third embodiment also offers the advantages similar to the advantages (3) to (6) and (8) to (13) of the first embodiment.

FIGS. 13, 14, 15A, 15B and 16 show the fourth embodiment of the motor-driven compressor according to the present invention. The fourth embodiment differs from the first embodiment in the structure of the support. In the drawings, same reference numerals are used for the common elements or components in the first and the fourth embodiments, and the description of such elements or components of the fourth embodiment will be omitted.

Figure 13:
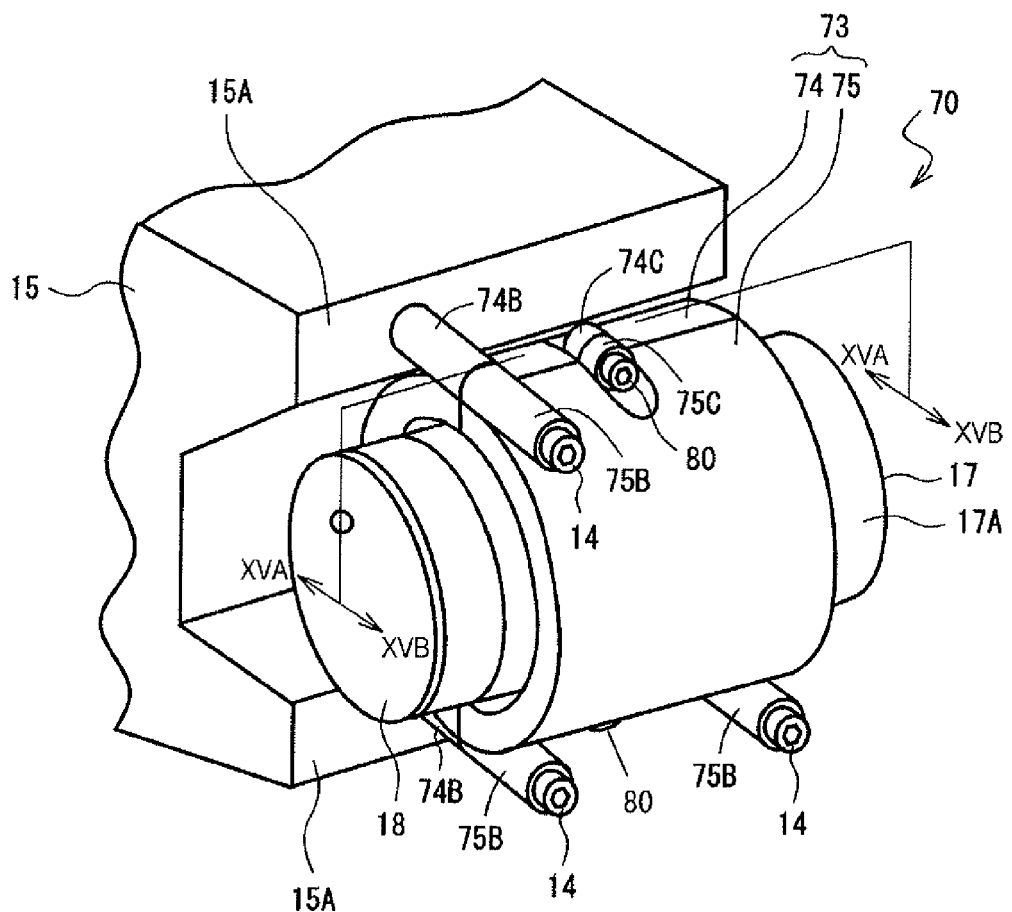
FIG. 13 is a perspective view of a fourth embodiment of the compressor according to the present invention.

As shown in FIG. 13, the motor-driven compressor which is designated generally by 70 has a support 73 that is mounted to the projections 15A of the object 15 by three bolts 14. The support 73 includes a first support member 74 and a second support member 75, through which the bolts 14 are inserted and screwed into the associated three threaded holes formed in the projections 15A of the object 15.

Figure 14:
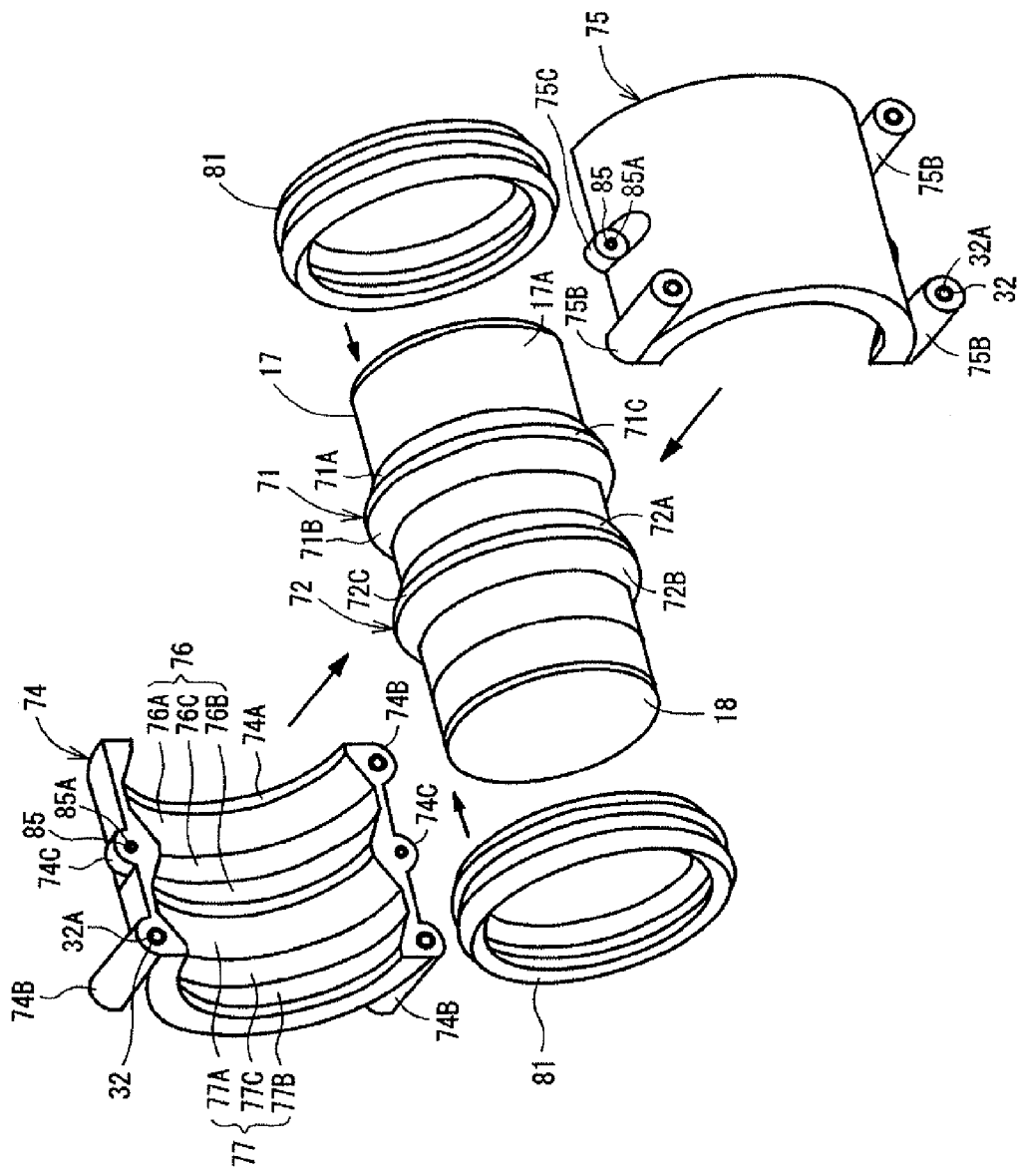
FIG. 14 is an exploded perspective view of the compressor of FIG. 13.
Figures 15A, 15B:
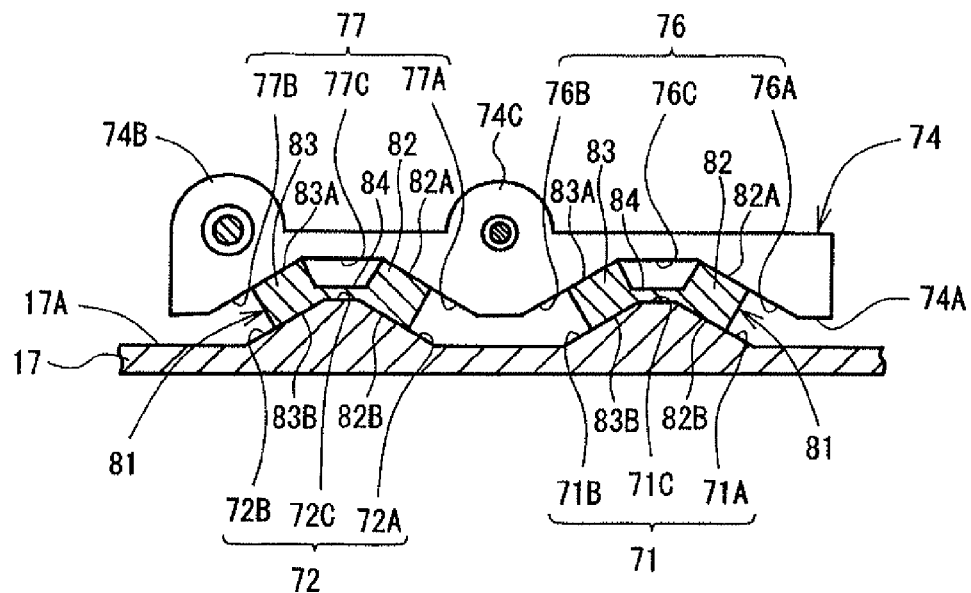
FIG. 15A is a partially-enlarged sectional view taken along the line XVA-XVA of FIG. 13.
FIG. 15B is a partially-enlarged sectional view taken along the line XVB-XVB of FIG. 13.

As shown in FIG. 14, the first housing 17 has on its outer peripheral surface 17A two projections 71, 72 which are substantially the same in shape and extend over the entire circumference of the outer peripheral surface 17A. As shown in FIGS. 15A and 15B, the projections 71, 72 project and generally taper radially outward. The projection 71 has a pair of inclined surfaces 71A, 71B tapered away from the outer peripheral surface 17A and an end surface 71C connecting the inclined surfaces 71A, 71B and extending parallel to the outer peripheral surface 17A. Similarly, the projection 72 has a pair of inclined surfaces 72A, 72B tapered away from the outer peripheral surface 17A and an end surface 72C connecting the inclined surfaces 72A, 72B and extending parallel to the outer peripheral surface 17A. The end surfaces 71C, 72C correspond to the end portion of the projection of the present invention. The projections 71, 72 are disposed on the outer peripheral surface 17A of the first housing 17 of the compressor 70 at the positions associated with the compression mechanism 11 and the electric motor 12.

The first and second support members 74, 75 are disposed extending over and covering the entire circumference of the outer peripheral surface 17A of the first housing 17. The first and second support members 74, 75 are symmetric about the vertical plane containing the longitudinal axis of the first housing 17. The first support member 74 has a generally semi-cylindrical shape and is disposed covering the first side of the first housing 17 facing the object 15. The second support member 75 has a generally semi-cylindrical shape and is disposed covering the second side of the first housing 17 opposite from the first side. The first and second support members 74, 75 are assembled together to form the support 73 in the form of a cylinder.

As shown in FIGS. 14 and 15A, the first support member 74 has on its inner peripheral surface 74A two recesses 76, 77 extending over the entire circumference of the inner peripheral surface 74A. As shown in FIG. 15A, the recesses 76, 77 are tapered radially outwardly of the first support member 74. Specifically, the recess 76 has a pair of inclined surfaces 76A, 76B tapered away from the inner peripheral surface 74A and a bottom surface 76C connecting the inclined surfaces 76A, 76B and extending parallel to the inner peripheral surface 74A. Similarly, the recess 77 has a pair of inclined surfaces 77A, 77B tapered away from the inner peripheral surface 74A and a bottom surface 77C connecting the inclined surfaces 77A, 77B and extending parallel to the inner peripheral surface 74A.

As shown in FIG. 15B, the second support member 75 has on its inner peripheral surface 75A two recesses 78, 79 extending over the entire circumference of the inner peripheral surface 75A. The recesses 78, 79 are tapered radially outwardly of the second support member 75. Specifically, the recess 78 has a pair of inclined surfaces 78A, 78B tapered away from the inner peripheral surface 75A and a bottom surface 78C connecting the inclined surfaces 78A, 78B and extending parallel to the inner peripheral surface 75A. Similarly, the recess 79 has a pair of inclined surfaces 79A, 79B tapered away from the inner peripheral surface 75A and a bottom surface 79C connecting the inclined surfaces 79A, 79B and extending parallel to the inner peripheral surface 75A. The recesses 76, 77 of the first support member 74 are disposed in engagement with the projections 71, 72 of the first housing 17, and the recesses 78, 79 of the second support member 75 are disposed in engagement with the projections 71, 72 of the first housing 17. The first and second support members 74, 75 are made of a material having good vibration damping properties such as resin or fiber reinforced resin.

As shown in FIGS. 13 and 14, the first support member 74 has at the opposite circumferential ends thereof three first mountings 74B and two additional mountings 74C extending tangentially to the first support member 74. Specifically, one first mounting 74B is formed at one axial end of the upper circumferential end of the first support member 74 in the drawings and two spaced first mountings 74B are formed at the opposite axial end of the other or lower circumferential end of the first support member 74 in the drawings, shown in FIG. 14. The mountings 74C are disposed at the axially middle position of each circumferential end of the first support member 74. That is, one first mounting 74B and one mounting 74C are formed at one circumferential end of the first support member 74, and two first mountings 74B and one mounting 74C are formed at the other circumferential end of the first support member 74.

Similarly, one second mounting 75B and one mounting 75C are formed at one circumferential end of the second support member 75, and two second mountings 75B and one mounting 75C are formed at the other circumferential end of the second support member 75.

The metal insert 32 having the hole 32A is fitted by insert molding in each of the first and second mountings 74B, 75B. When the first and second support members 74, 75 are assembled together, the holes 32A of the first mountings 74B are aligned coaxially to their associated holes 32A of the second mountings 75B, through which the bolts 14 are inserted for mounting the compressor to the object 15. A metal insert 85 having therein a threaded hole 85A is fitted as a reinforcement in each of the mountings 74C, 75C by insert molding. When the first and second support members 74, 75 are assembled together, the threaded holes 85A of the mountings 74C are aligned coaxially to their associated threaded holes 85A of the mountings 75C, into which bolts 80 are screwed for coupling the first and second support members 74, 75.

There are provided two vibration dampers 81 interposed between the respective projections 71, 72 of the first housing 17 and the recesses 76, 77 of the first support member 74 and also between the respective projections 71, 72 and the recesses 78, 79 of the second support member 75. The first and second support members 74, 75 support the first housing 17 through the vibration dampers 81.

Figure 16:
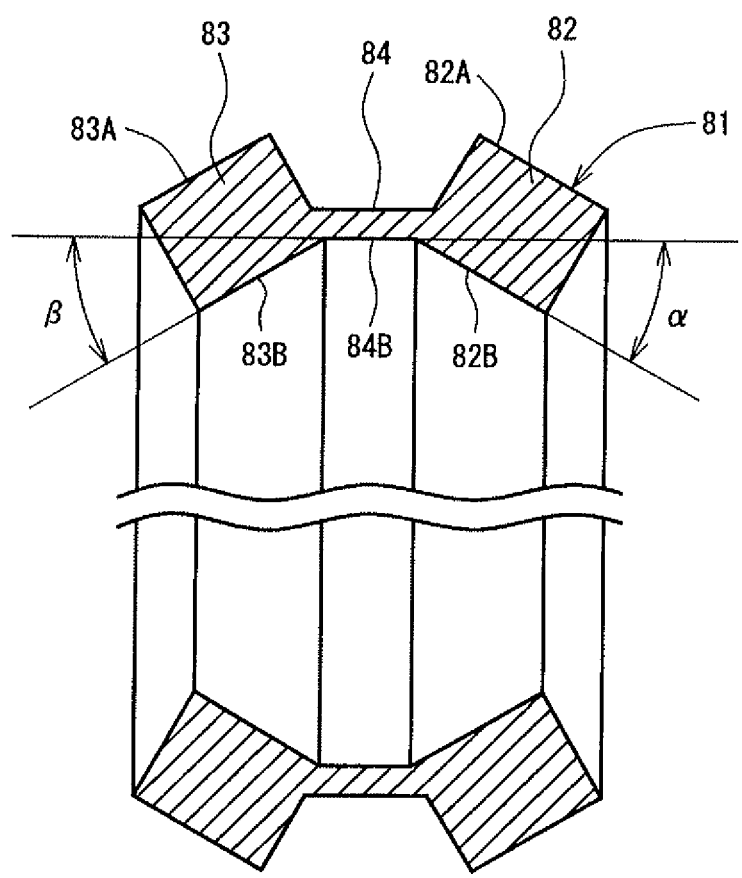
FIG. 16 is a partially-enlarged sectional view of the vibration damper of the compressor of FIG. 13.

As shown in FIG. 14, the vibration dampers 81 are both in the form of a ring and previously fitted onto the respective projections 71, 72 of the first housing 17 prior to the mounting of the first and second support members 74, 75 to the first housing 17. The vibration dampers 81 are disposed covering the entire circumference of the projections 71, 72 of the first housing 17. As shown in FIG. 16, the vibration damper 81 has two protrusions 82, 83 and an intermediate connecting portion 84 connecting the protrusions 82, 83. The protrusions 82, 83 both have a rectangular cross section and inclined relative to the intermediate connecting portion 84. The protrusions 82, 83 have outer peripheral surfaces 82A, 83A and inner peripheral surfaces 82B, 83B, respectively. The intermediate connecting portion 84 has an inner peripheral surface 84B. Symbol $\alpha$ indicates an inclination of the protrusion 82 relative to the intermediate connecting portion 84, and symbol 13 indicates an inclination of the protrusion 83 relative to the intermediate connecting portion 84. The inner peripheral surface 82B of the protrusion 82 is inclined in one direction at an angle $\alpha$ relative to the inner peripheral surface 84B of the intermediate connecting portion 84, while the inner peripheral surface 83B of the protrusion 83 is inclined in the opposite direction in FIG. 16 at an angle $\beta$ relative to the inner peripheral surface 84B of the intermediate connecting portion 84. In the present embodiment, the angles $\alpha$, $\beta$ are substantially equal, but may be set suitably depending on the vibration characteristic of the object 15.

As shown in FIGS. 15A and 15B, the two vibration dampers 81 are disposed between the outer peripheral surface 17A of the first housing 17 and the first and second support members 74, 75. In one of the vibration dampers 81, the intermediate connecting portion 84 covers the end surface 71C of the projection 71, and the protrusions 82, 83 are disposed between the inclined surfaces 76A, 76B of the recess 76 and the associated inclined surfaces 71A, 71B of the projection 71 and also between the inclined surfaces 78A, 78B of the recess 78 and the associated inclined surfaces 71A, 71B of the projection 71. That is, the inner peripheral surface 82B of the protrusion 82 of the vibration damper 81 is in contact with the inclined surfaces 71A of the projection 71 of the first housing 17, and the outer peripheral surface 82A of the protrusion 82 is in contact with the inclined surfaces 76A, 78A of the recesses 76, 78 of the first and second support members 74, 75. Similarly, the inner peripheral surface 83B of the protrusion 83 of the vibration damper 81 is in contact with the inclined surface 71B of the projection 71 of the first housing 17, and the outer peripheral surface 83A of the protrusion 83 is in contact with the inclined surfaces 76B, 78B of the recesses 76, 78 of the first and second support members 74, 75.

In the other of the vibration dampers 81, the intermediate connecting portion 84 covers the end surface 71C of the projection 71, and the protrusions 82, 83 are disposed between the inclined surfaces 77A, 77B of the recess 77 and the associated inclined surfaces 72A, 72B of the projection 72 and also between the inclined surfaces 79A, 79B of the recess 79 and the associated inclined surfaces 72A, 72B of the projection 72. That is, the inner peripheral surface 82B of the protrusion 82 of the vibration damper 81 is in contact with the inclined surfaces 72A of the projection 72 of the first housing 17, and the outer peripheral surface 82A of the protrusion 82 is in contact with the inclined surfaces 77A, 79A of the recesses 77, 79 of the first and second support members 74, 75. Similarly, the inner peripheral surface 83B of the protrusion 83 of the vibration damper 81 is in contact with the inclined surface 72B of the projection 72 of the first housing 17, and the outer peripheral surface 83A of the protrusion 83 is in contact with the inclined surfaces 77B, 79B of the recesses 77, 79 of the first and second support members 74, 75. The vibration dampers 81 are made of a rubber, specifically, a material having at least one of the thermal resistance and the durability such as silicone rubber or ethylene-propylene rubber.

The following will describe a procedure of mounting the motor-driven compressor 70 to the object 15. Firstly, as shown in FIG. 14, one of the two vibration dampers 81 is fitted onto the projection 71 of the first housing 17 from the end of the first housing 17 adjacent to the projection 71, while the other vibration damper 81 is fitted onto the projection 72 of the first housing 17 from the end of the second housing 18, as indicated by arrows. Next, the first support member 74 is positioned on the first side of the first housing 17 so that the recesses 76, 77 of the first support member 74 are engaged with the projections 71, 72 of the first housing 17 having thereon the vibration dampers 81. Similarly, the second support member 75 is positioned on the second side of the first housing 17 so that the recesses 78, 79 of the second support member 75 are engaged with the projections 71, 72 of the first housing 17 having thereon the vibration dampers 81.

By doing so, the holes 32A of the first mountings 74B at the opposite ends of the first support member 74 are placed coaxially with the associated holes 32A of the second mountings 75B at the opposite ends of the second support member 75. Also the threaded holes 85A of the mountings 74C at the opposite ends of the first support member 74 are placed coaxially with the threaded holes 85A of the mountings 75C at the opposite ends of the second support member 75.

With the first and second support members 74, 75 combined together, screwing the bolts 80 into the threaded holes 85A of the mountings 74C, 75C from the second side of the first housing 17, the first and second support members 74, 75 are fastened together.

Then, with the first and second support members 74, 75 fastened together, the bolts 14 are inserted through the holes 32A of the first and second mountings 74B, 75B of the respective first and second support members 74, 75 and screwed into the threaded holes of the projections 15A of the object 15. By doing so, the first mountings 74B come into contact with the associated second mountings 75B, so that the vibration dampers 81 are compressed in the direction in which the bolt 14 is tightened.

In this way, the first and second support members 74, 75 are tightly coupled together, and the compressor 70 is fixedly mounted to the object 15 at three points. The first and second support members 74, 75 fixed to the object 15 by the bolts 14 support the first housing 17 through the vibration dampers 81. That is, the first and second support members 74, 75 are indirectly connected to the first housing 17 through the vibration dampers 81, but neither the first support member 74 nor the second support member 75 is in direct contact with the first housing 17.

In the above-described compressor 70, as shown in FIG. 15A, the vibration dampers 81 are disposed between the projections 71, 72 of the first housing 17 and the recesses 76, 77 of the first support member 74. In the vibration damper 81 disposed between the projection 71 and the recess 76, the protrusions 82, 83 are compressed and elastically deformed between the inclined surfaces 71A, 71B of the projection 71 and the inclined surfaces 76A, 76B of the recess 76. That is, the protrusion 82 is compressed and elastically deformed between the inclined surfaces 71A, 76A, and the protrusion 83 is compressed and elastically deformed between the inclined surfaces 71B, 76B. In the vibration damper 81 disposed between the projection 72 and the recess 77, the protrusions 82, 83 are compressed and elastically deformed between the inclined surfaces 72A, 72B of the projection 72 and the inclined surfaces 77A, 77B of the recess 77. That is, the protrusion 82 is compressed and elastically deformed between the inclined surfaces 72A, 77A, and the protrusion 83 is compressed and elastically deformed between the inclined surfaces 72B, 77B. The vibration dampers 81 thus disposed between the first housing 17 and the first support member 74 allows reduction of the radial and axial vibration of the compressor 70. The same is true of the vibration dampers 81 disposed between the projections 71, 72 of the first housing 17 and the recesses 78, 79 of the second support member 75 shown in FIG. 15B, and the description of such components will be omitted.

The projections 71, 72 are disposed on the outer peripheral surface 17A of the first housing 17 of the compressor 70 at the positions associated with the compression mechanism 11 and the electric motor 12. While the compressor 70 is operating, the vibration generated by the compression mechanism 11 is absorbed mainly by the vibration damper 81 disposed on the projection 72, and the vibration generated by the electric motor 12 is absorbed mainly by the vibration damper 81 disposed on in the projection 71, resulting in an effective reduction of the vibration generated by the compression mechanism 11 and the electric motor 12. In addition, the vibration dampers 81 are both in the form of a ring and previously fitted onto the respective projections 71, 72 of the first housing 17 prior to the mounting of the first and second support members 74, 75. This allows the vibration dampers 81 to be easily positioned and mounted in place without using any adhesive. Furthermore, the first and second support members 74, 75 are fastened together by screwing the bolts 80 into the threaded holes 85A of the mounting 74C, 75C of the first and second support members 74, 75, and then the fastened first and second support members 74, 75 are fixed to the object 15 by the bolts 14, which allows easier installation of the compressor 70 to the object 15. The fourth embodiment of the present invention also offers advantages similar to the advantages (5), (6), and (8) to (13) of the first embodiment.

It is to be understood that the present invention is not limited to the above-described embodiments, but it may be modified in various ways as exemplified below without departing from the scope of the invention.

Figure 17A:
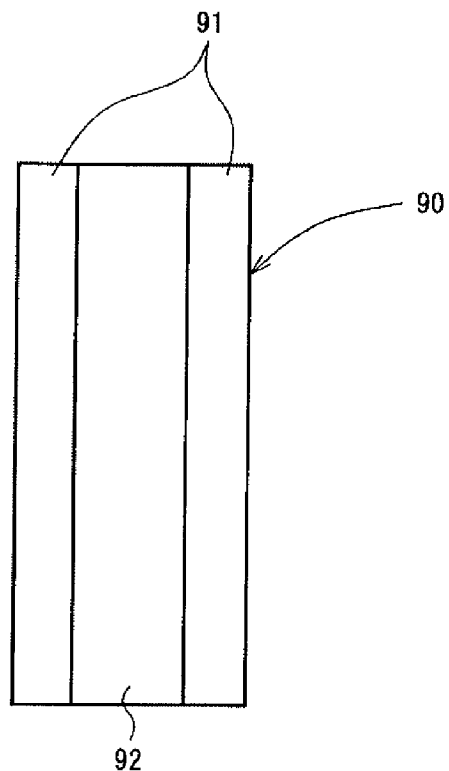
FIGS. 17A, 17B and 17C are schematic views of another embodiment of the compressor according to the present invention.
Figure 17B:
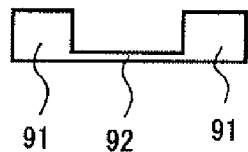
Figure 17C:
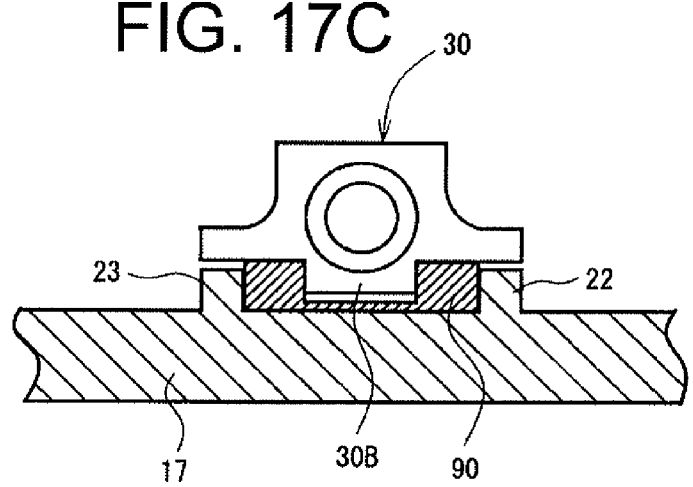

In the first embodiment, the first and second vibration dampers 33, 34 disposed on the opposite sides of the projections 30B, 31B of the first and second support members 30, 31, respectively, may be replaced by a vibration damper 90 as shown in FIGS. 17A, 17B and 17C. The vibration damper 90 has two parallelly arranged protrusions 91 and an intermediate connecting portion 92 connecting the protrusions 91. As shown in FIG. 17C, the protrusions 91 of the vibration damper 90 are disposed on opposite sides of the projection 30B of the first support member 30, and the intermediate connecting portion 92 is disposed covering the projection 30B. With the first support member 30 and the first housing 17 assembled together, a gap is formed between the projection 30B and the intermediate connecting portion 92 and, therefore, there is no contact between the first support member 30 and the first housing 17. Such configuration allows the vibration dampers 90 to be previously fitted onto the projections 30B, 31B of the first and second support members 30, 31 prior to the mounting of the first and second support members 30, 31 to the first housing 17, which allows easy mounting of the vibration damper 90 to the first and second support members 30, 31 without using any adhesive.

Figure 18:
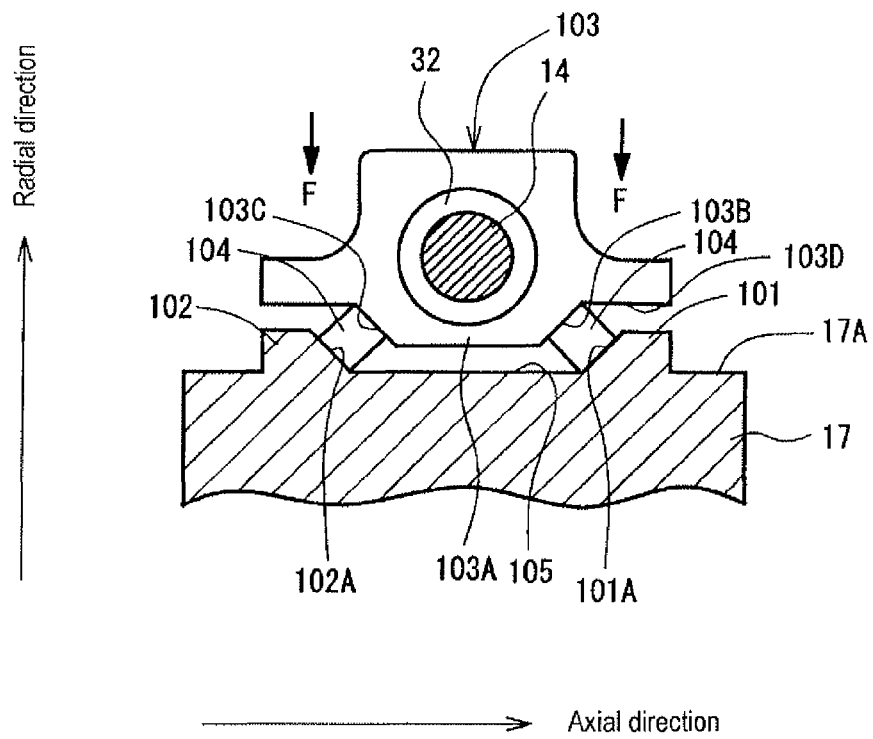
FIG. 18 is a schematic sectional view of still another embodiment of the compressor according to the present invention.

In the first embodiment, the first housing 17 may have on the outer peripheral surface 17A thereof ribs 101, 102 that form therebetween a recess 105, as shown in FIG. 18. The recess 105 has a pair of inclined surfaces 101A, 102A that are tapered toward the outer peripheral surface 17A. The support 103 has on its inner peripheral surface 103D a projection 103A having on the opposite sides thereof a pair of inclined surfaces 103B, 103C that are tapered toward the outer peripheral surface 17A of the first housing 17. With the projection 103A of the support 103 disposed in engagement with the recess 105 of the first housing 17, the inclined surfaces 101A, 103B are parallel and in facing relation to each other, and the inclined surfaces 102A, 103C are also parallel and in facing relation to each other. Vibration dampers 104 are provided between the inclined surfaces 101A, 103B and between the inclined surfaces 102A, 103C while being compressed and elastically deformed, allowing reduction of the radial and axial vibration of the compressor. Such vibration damper 104 need not to be in contact with the surface other than the inclined surfaces 101A, 102A, 103B, 103C, differently from the case of the first embodiment, which facilitates the mounting of the vibration damper 104.

Figure 19:
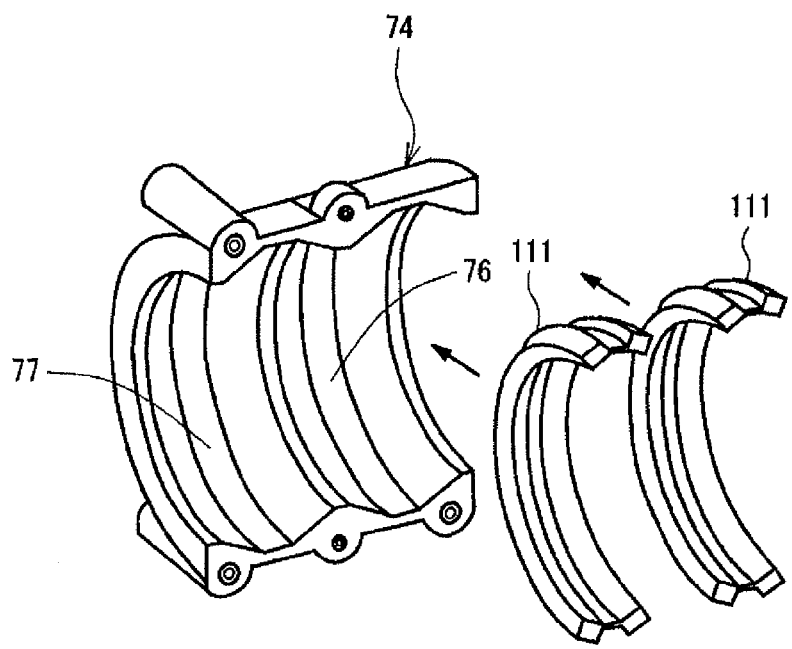
FIG. 19 is a schematic perspective view of further still another embodiment of the compressor according to the present invention.

In the fourth embodiment, the annular vibration damper 81 may be replaced by two separate vibration dampers 111 as shown in FIG. 19. Such separate vibration dampers 111 may be previously fitted and attached to the recesses 76, 77 of the first support member 74 and also to the recesses 78, 79 of the second support member 75 prior to the mounting of the first and second support members 74, 75 to the first housing 17. Alternatively, the separate vibration dampers 111 may be previously fitted onto the projections 71, 72 on the respective first and second sides of the first housing 17 prior to the mounting of the first and second support members 74, 75, as in the case of the fourth embodiment.

Although in the first embodiment two sets of first support member 30 and two sets of second support member 31 are provided, the first support members 30 may be coupled together to form one unit of the first support member, and also the second support members 31 may be coupled together to form one unit of the second support member. The unit of the first support member is disposed on one side of the first housing, while the unit of the second support member is disposed on the other side of the first housing 17, which allows reduction of time for mounting of the first and second support members.

In the first embodiment, the first and second vibration dampers 33, 34 combined together so as to cover the entire circumference of the outer peripheral surface 17A of the first housing 17 may be replaced by an annular vibration damper. In addition, the first and second vibration dampers 33, 34 do not necessarily need to cover the entire circumference of the outer peripheral surface 17A. For example, the first and second vibration dampers 33, 34 of shorter circumferential length may be mounted to the first housing 17 with a space formed therebetween without covering the entire circumference of the first housing 17. Alternatively, plural vibration dampers of still shorter length may be arranged circumferentially at an interval.

In the first embodiment, the number of supports such as 28, 29 is not limited to two, but it may be one, or three or more. The number of supports may be changed depending on the shape of the object to which the compressor is mounted.

In the first to fourth embodiments, the number of mountings may be changed depending on the object to which the compressor is mounted.

Although in the first to fourth embodiments the compressor is mounted to the vertical surface of the object 15, the compressor may be mounted to any other surface of the object 15 than the vertical surface, such as horizontal surface or inclined surface, and the compressor may be oriented in any direction, for example, horizontally, vertically or obliquely.

In the first to third embodiments, there may be provided a mechanism including a pawl provided in the first mounting of the first support member and its associated groove provided in the second mounting of the second support member. When the first and second support members are positioned in place on the respective sides of the first housing, the pawl is engaged with the groove so that the first and second support members are temporarily held. After that, the bolts are inserted through the first and second mountings of the first and second support members and screwed into the object. Such configuration allows easy installation of the compressor.

In the first to third embodiments, the vibration damper may be previously fixed to the support by heat.

Although in the first to third embodiments and other embodiments of FIGS. 17C and 18 the projection is formed on the inner peripheral surface of the support member and its associated recess is formed on the outer peripheral surface of the housing, a recess may be formed on the inner peripheral surface of the support member and its associated projection may be on the outer peripheral surface of the housing.

Although in the fourth embodiment the recess is formed on the inner peripheral surface of the support member and its associated projection is formed on the outer peripheral surface of the housing, a projection may be formed on the inner peripheral surface of the support member and its associated recess may be on the outer peripheral surface of the housing.

In the first to fourth embodiments the support includes the first and second support members, the first support member and the second support member may be coupled together to form one unit.

In the first to fourth embodiments, the material, hardness or natural frequency of the rubber used for the vibration damper may be changed suitably. For example, the material or hardness of the vibration damper may be changed depending on the types of vehicle or also on the locations where the vibration damper is disposed in the vehicle. Such customization of the vibration damper depending on the vibration characteristics of the vehicle allows more effective reduction of the vibration.

Although in the first embodiment the first and second vibration dampers 33, 34 have a rectangular cross section, the first and second vibration dampers 33, 34 may have a round or polygonal cross section. In the second embodiment, the vibration damper 45 may have a round or oval cross section in FIGS. 8A and 8B. In the third embodiment, the vibration dampers 62, 63 may have a round cross section in FIG. 12. Although in the fourth embodiment the protrusions 82, 83 of the vibration damper 81 have a rectangular cross section, the protrusions 82, 83 may have a round, elliptical or polygonal cross section in FIG. 16.

Although in the first to fourth embodiments the support is made of a resin or fiber reinforced resin, the support may be made of a metal such as aluminum or steel. Such metal support requires no metal insert such as 32, 85.

Although in the first to fourth embodiments the vibration damper has the thermal resistance and/or durability, the vibration damper may have electric conductivity. If the support and the vibration damper are both electrically conductive, the compressor can be grounded through the vibration damper and hence requires no additional means of grounding.

Although in the first to third embodiments the recess for mounting the support member is formed by ribs provided on the housing, the recess may be formed, for example, by a groove provided in the housing, without providing such ribs.

In the second and third embodiments, the projection formed in the center of the recess of the support may be replaced by a projection formed directly in the support without providing such recess.

In the first to fourth embodiments, the compression mechanism 11 is of a scroll type, but it may be of any known type such as reciprocating type or vane type.

What is claimed is:

1. A motor-driven compressor, comprising:
an electric motor;
a compression mechanism driven by the electric motor to compress refrigerant;
a housing accommodating the electric motor and the compression mechanism; and
a support having a mounting to be fastened to an object by a fastener,
wherein one of the housing and the support has a projection and the other of the housing and the support has a recess that is engaged with the projection through a vibration damper so that the support supports the housing;
wherein the vibration damper is disposed covering an entire circumference of an outer peripheral surface of the housing;
wherein the projection is formed on the outer peripheral surface of the housing, the projection has a pair of inclined surfaces tapered away from the outer peripheral surface of the housing and an end portion connecting the inclined surfaces,
the recess is formed on an entire circumference of an inner peripheral surface of the support and has a pair of inclined surfaces tapered away from the inner peripheral surface of the support, and
the vibration damper is disposed between the inclined surfaces of the projection and the inclined surfaces of the recess;
wherein the vibration damper forms two protrusions and an intermediate connecting portion connecting the protrusions; and
wherein the protrusions contact the projection and the recess, and the intermediate connecting portion contacts the outer peripheral surface of the housing and a space is formed between the intermediate connecting portion and the inner peripheral surface of the support.

2. The motor-driven compressor of claim 1, wherein the support is disposed covering the outer peripheral surface of the housing at least at a position where the vibration damper is disposed.

3. The motor-driven compressor of claim 1, wherein the intermediate connecting portion covers the end portion of the projection, and the protrusions are disposed between the inclined surfaces of the projection and the inclined surfaces of the recess.

4. The motor-driven compressor of claim 1, wherein the mounting includes a first mounting and a second mounting through which the fastener is inserted and secured to the object so that the support is fastened to the object and supports the housing.

5. The motor-driven compressor of claim 4, wherein the support includes a first support member having the first mounting and a second support member having the second mounting.

6. The motor-driven compressor of claim 1, wherein the vibration damper is disposed on the outer peripheral surface of the housing at least at a position associated with the compression mechanism or the electric motor.

7. The motor-driven compressor of claim 1, wherein the support is made of a resin or fiber reinforced resin.

8. The motor-driven compressor of claim 1, wherein the mounting has a metal insert fitted therein.

9. The motor-driven compressor of claim 1, wherein the vibration damper is made up of a material having at least one of the thermal resistance, the durability and the electric conductivity.

10. The motor-driven compressor of claim 9, wherein the vibration damper is made of silicone rubber or ethylene-propylene rubber.

11. The motor-driven compressor of claim 1, wherein a set of the projection, the recess and the vibration damper are plurally formed on the axial direction of the housing.

* * * * *